United States Patent
Manning et al.

(10) Patent No.: US 11,053,668 B1
(45) Date of Patent: Jul. 6, 2021

(54) INTELLIGENT WATER MONITORING SYSTEM

(71) Applicant: Hydrodynamic Technologies LLC, San Jose, CA (US)

(72) Inventors: Patrick Manning, Santa Cruz, CA (US); Steve Samuel, San Jose, CA (US); Landon Ritchie, Gilroy, CA (US); Alex Barangan, Felton, CA (US); Ethan Underhill, North Las Vegas, NV (US); Roger Brasel, Kailua-Kona, HI (US); William Underhill, Las Vegas, NV (US)

(73) Assignee: Hydrodynamic Technologies LLC, San Jose, CA (US)

( * ) Notice: Subject to any disclaimer, the term of this patent is extended or adjusted under 35 U.S.C. 154(b) by 0 days.

(21) Appl. No.: 17/152,680

(22) Filed: Jan. 19, 2021

Related U.S. Application Data

(60) Provisional application No. 62/975,130, filed on Feb. 11, 2020, provisional application No. 63/000,128, (Continued)

(51) Int. Cl.
*G08B 21/00* (2006.01)
*E03B 7/00* (2006.01)
(Continued)

(52) U.S. Cl.
CPC .............. *E03B 7/003* (2013.01); *E03B 7/075* (2013.01); *G01M 3/2815* (2013.01); *H04W 88/02* (2013.01)

(58) Field of Classification Search
CPC ................................. E03B 7/003; E03B 7/071
(Continued)

(56) References Cited

U.S. PATENT DOCUMENTS

| | | | |
|---|---|---|---|
| 8,489,342 | B2 | 7/2013 | Dugger et al. |
| 8,606,413 | B2 | 12/2013 | Picton |

(Continued)

FOREIGN PATENT DOCUMENTS

| | | |
|---|---|---|
| CA | 2968991 C | 11/2016 |
| CA | 2969343 A1 | 3/2017 |

(Continued)

OTHER PUBLICATIONS

Korean Intellectual Property Office, International Search Report and Written Opinion of the International Searching Authority, dated May 11, 2021, in PCT/US2021/014149 which is the international application which shares the same priority as this U.S. application.

*Primary Examiner* — Tai T Nguyen
(74) *Attorney, Agent, or Firm* — Kolitch Romano LLP

(57) ABSTRACT

An intelligent water-monitoring system includes a water-monitoring device installable inline with a building water system (e.g., at an inlet of the system). A plurality of sensors of the water-monitoring device are configured to sense properties of the building water system, such as water pressure and water flow. The water-monitoring device has a valve and a controller configured to automatically shut the valve in response to sensed data indicating a possible problem in the building water system. The intelligent water-monitoring system may include an app executable by a computing device to display information based on the sensed data.

10 Claims, 21 Drawing Sheets

Related U.S. Application Data filed on Mar. 26, 2020, provisional application No. 63/007,195, filed on Apr. 8, 2020.

(51) Int. Cl.
*E03B 7/07* (2006.01)
*G01M 3/28* (2006.01)
*H04W 88/02* (2009.01)

(58) Field of Classification Search
USPC ........... 340/605, 517, 521, 533.26, 540, 541
See application file for complete search history.

(56) References Cited

U.S. PATENT DOCUMENTS

| | | |
|---|---|---|
| 9,410,833 B1 | 8/2016 | Leaders et al. |
| 9,857,805 B2 | 1/2018 | Halimi |
| 10,094,095 B2 | 10/2018 | Enev et al. |
| 10,229,579 B2 | 3/2019 | Alcorn |
| 10,428,495 B2 | 10/2019 | Halimi |
| D866,375 S | 11/2019 | Waters |
| 10,527,516 B2 | 1/2020 | Banerjee et al. |
| 2006/0260691 A1* | 11/2006 | Davidoff ............. G01M 3/2815 137/487.5 |
| 2014/0230925 A1 | 8/2014 | Halimi |
| 2015/0330818 A1 | 11/2015 | Leaders et al. |
| 2016/0341029 A1* | 11/2016 | Phillips ................... E21B 47/06 |
| 2016/0348802 A1 | 12/2016 | Halimi et al. |
| 2017/0159267 A1 | 6/2017 | Halimi |
| 2017/0261394 A1 | 9/2017 | Halimi |
| 2018/0230681 A1* | 8/2018 | Poojary ................. G01F 15/063 |
| 2018/0347157 A1 | 12/2018 | Brotherton |
| 2018/0356265 A1 | 12/2018 | Waters et al. |
| 2019/0063689 A1* | 2/2019 | Liu ..................... G01M 3/2815 |
| 2019/0173302 A1 | 6/2019 | Waters et al. |
| 2019/0204177 A1 | 7/2019 | Banerjee et al. |
| 2019/0250064 A1 | 8/2019 | Banerjee et al. |
| 2020/0393324 A1* | 12/2020 | Rudd ................. G01F 23/0069 |

FOREIGN PATENT DOCUMENTS

| | | |
|---|---|---|
| JP | 05346334 A | 12/1993 |
| JP | 6124410 B2 | 5/2017 |
| WO | 2015159040 A1 | 10/2015 |
| WO | 2016187020 A1 | 11/2016 |
| WO | 2017040267 A1 | 3/2017 |

\* cited by examiner

INTELLIGENT WATER MONITORING SYSTEM

CROSS-REFERENCES

The following applications and materials are incorporated herein, in their entireties, for all purposes: U.S. Provisional Patent Application No. 62/975,130 filed Feb. 11, 2020; U.S. Provisional Patent Application No. 63/000,128 filed Mar. 26, 2020; and U.S. Provisional Patent Application No. 63/007,195 filed Apr. 8, 2020.

FIELD

This disclosure relates to systems and methods for sensing water usage and/or leakage in a home or other building.

INTRODUCTION

Water usage is a concern for many types of buildings, including residences, businesses, and others. For example, the presence of a leak in the building's water system can lead to wasted water, increased utility bills, and significant damage to the building and objects inside. Timely leak detection can mitigate or avoid these problems by allowing the leakage point to be isolated and/or repaired before the leak (or resultant damage) worsens. Accordingly, systems and methods are needed for quickly detecting information about water usage and leaks in the building water system.

SUMMARY

The present disclosure provides systems, apparatuses, and methods relating to sensing water usage and/or leakage.

In some embodiments, a method for determining a height of a leak in a plumbing system may include isolating a leaking plumbing system from a water supply by closing a shutoff valve of a monitoring device installed at an inlet of the plumbing system, such that the monitoring device is in fluid communication only with the leaking plumbing system; receiving, from a pressure sensor of the monitoring device, data corresponding to a decreasing pressure of water in the plumbing system; predicting, based on the data corresponding to the decreasing pressure, a final constant pressure of water in the plumbing system using processing logic of the monitoring device; and determining, using the processing logic, a water height corresponding to the predicted final constant pressure, the water height corresponding to a height of the leak.

In some embodiments, a method for monitoring a building water system may include: at a selected time when a building water system is not otherwise in use, automatically isolating the building water system from a water supply by closing a shutoff valve of a monitoring device installed at an inlet of the building water system, such that the monitoring device is in fluid communication only with the building water system; based on a decreasing water pressure sensed by a pressure sensor of the monitoring device, predicting a final constant water pressure assuming a leak in the building water system, using one or more processors; determining, using the one or more processors, a water height corresponding to the predicted final constant pressure, the water height corresponding to a height of the leak; and communicating the height of the leak to a remote electronic device.

In some embodiments, a water-monitoring device configured to be installed inline between a building water system and a water supply thereof, may include: a pipe spool having an inlet at a first end, an outlet at a second end, and a plurality of ports; a plurality of sensors including: a first ultrasonic transceiver disposed adjacent a first port of the plurality of ports; a second ultrasonic transceiver disposed adjacent a second port of the plurality of ports; and a pressure sensor disposed adjacent a third port of the plurality of ports; a shutoff valve disposed between the inlet and the third port, such that a pressure of the building water system is sensed by the pressure sensor when the shutoff valve is closed; an electronic controller in communication with each of the plurality of sensors; and a communications module in communication with the controller and configured to transmit data sensed by the plurality of sensors.

Features, functions, and advantages may be achieved independently in various embodiments of the present disclosure, or may be combined in yet other embodiments, further details of which can be seen with reference to the following description and drawings.

DETAILED DESCRIPTION

Figure 1:
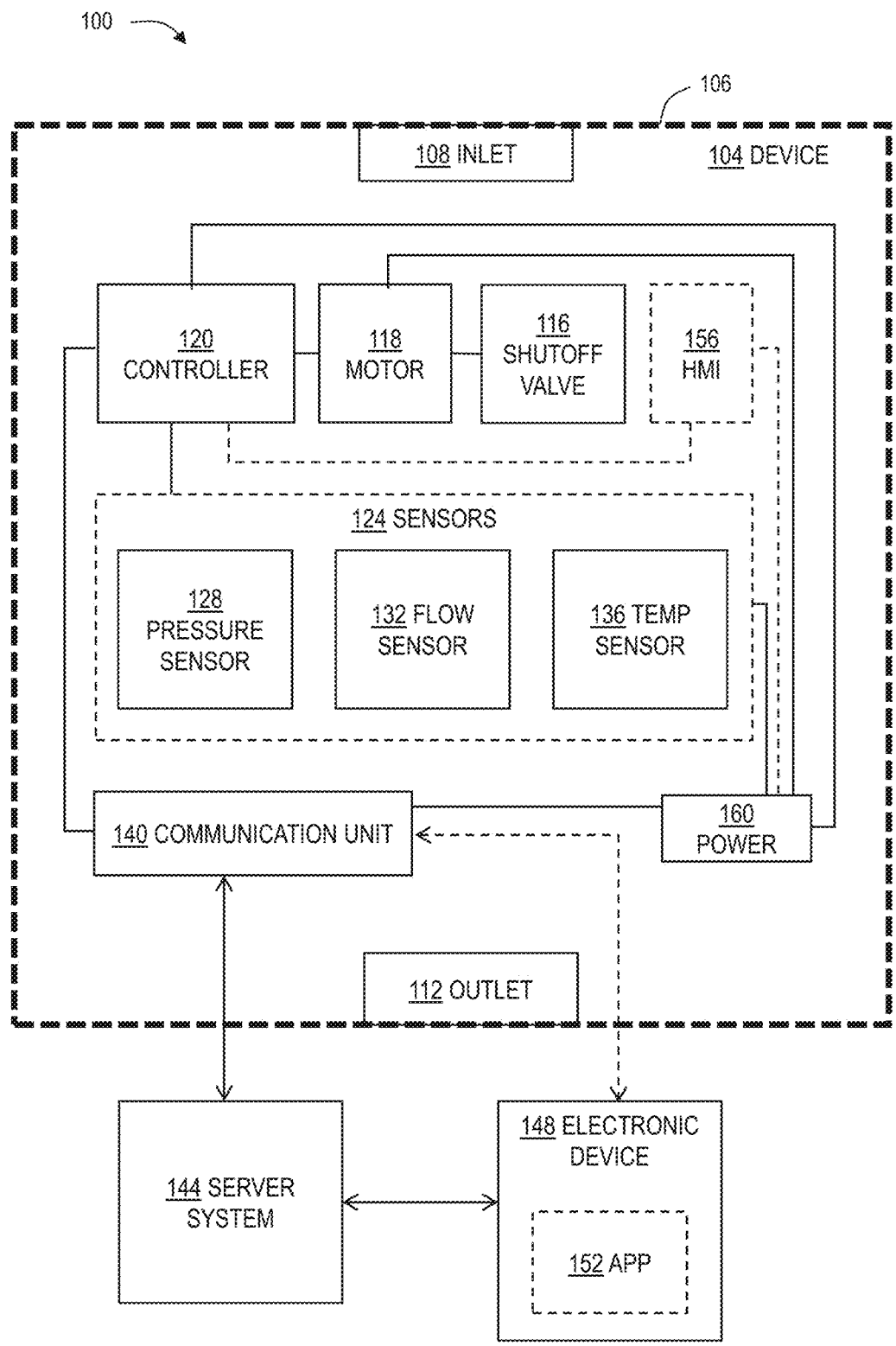
FIG. 1 is a schematic diagram of an illustrative intelligent water-monitoring system, in accordance with aspects of the present teachings.

Various aspects and examples of an intelligent water-monitoring system, as well as related methods, are described below and illustrated in the associated drawings. Unless otherwise specified, a water-monitoring system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through H, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an intelligent water-monitoring system includes one or more sensors configured to sense data related to water pressure and/or flow, and an electrically controlled shut-off valve. The sensor(s) and valve are at least partially enclosed in a housing, comprising a device installable inline with the building water system (e.g., a plumbing system of the building). The device further includes a data communication mechanism facilitating transmission of information related to the sensed data and/or reception of information or instructions.

The device is generally installed at an inlet of the building water system, so that closing the shutoff valve disconnects most or all of the building water system from its water supply. An electronic controller of the device is configured to selectively close the shutoff valve in response to a suitable event, such as detection of a leak or other anomaly, or in response to a received command. This may reduce water loss and/or damage to the building. In some examples, the shutoff valve is positioned upstream of at least some sensors of the device, which allows the device to continue to sense data related to the building system even after the shutoff valve has been closed.

The water-monitoring system may further include a software application allowing a user to interface with the device (e.g., to view information transmitted by the device, to send commands to the device, etc.). In some examples, the software comprises an app for a mobile device. Alternatively, or additionally, the system may include a human-machine interface (HMI) disposed at or incorporated into the device itself.

Aspects of the intelligent water-monitoring system, such as the electronic controller and/or software app, may be embodied as a computer method, computer system, or computer program product. Accordingly, aspects of the system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of intelligent water monitoring may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the intelligent water monitoring system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the water monitoring system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative intelligent water-monitoring systems as well as related systems and/or methods. The examples in these sections are intended for illustration and should not be interpreted as limiting the scope of the present disclosure.

Each section may include one or more distinct embodiments or examples, and/or contextual or related information, function, and/or structure.

A. Illustrative Intelligent Water-Monitoring System

With reference to FIG. 1, this section describes an illustrative intelligent water-monitoring system 100, which is an example of the system described above.

System 100 includes a sensing device 104, which is configured to be installed inline in a water system of a building. During normal operation, water enters device 104 at an inlet 108 and exits the device at an outlet 112, flowing from the outlet to the inlet. In some examples, device 104 comprises a housing 106 configured to at least partially contain some or all device components.

Device 104 may include any suitable structure for enabling flow of water between inlet 108 and outlet 112 while facilitating measurement of various aspects of that flow. For example, one or more pipes or tubes (e.g., a pipe spool) may be utilized to place inlet 108 and outlet 112 in fluid communication with each other.

Device 104 further includes a shutoff valve 116 driven by a valve motor 118. Valve motor 118 drives valve 116 to selectively open and close the device (i.e., to selectively allow and prevent or shut off water flow into the device at or adjacent inlet 108) in response to a signal received from a controller 120. Valve 116 may comprise any device(s) suitable for selectively enabling water flow in this manner. For example, valve 116 may comprise a ball valve. In some examples, valve 116 may include a throttle valve configured to control the flow rate of the water and/or a check valve configured to prevent backflow.

Motor 118 actuates valve 116, e.g., by rotating the ball valve, based on signal(s) received from an electronic controller 120. Controller 120 may comprise any processing logic suitable for carrying out this function and additional functions as described below.

As described above, device 104 is normally installed at the inlet of the building water system, or at the inlet of a portion of a building water system. For example, device 104 may be installed between a water system of a house and the municipal water main. As another example, device 104 may be installed between a water system of a portion of a building (e.g., a unit in an apartment building or commercial building) and a pipe in the water system supplying water to that building portion. Accordingly, closing shutoff valve 116 shuts the building (or building portion) off from the water supply. For clarity, the device is described hereinafter as being installed between a water supply and a building system, such that closing the valve disconnects the entire building system from the water supply. However, it should be understood that a similar description applies for a portion of a building.

Device 104 includes one or more sensors 124 configured to sense information related to water flowing through (or stationary in) the device. Sensors 124 include at least a pressure sensor 128, a flow sensor 132, and a temperature sensor 136.

Sensors 124 are disposed downstream of shutoff valve 116, such that when the valve is in a closed position, the sensors are not shut off from the building system's piping (i.e., they continue to sense one or more properties of water in the building water system, such as water pressure). In some examples, one or more additional sensors may be disposed upstream of the valve.

Controller 120 is configured to receive sensed data from sensors 124 and to transmit the sensed data, and/or information corresponding to the sensed data, off-device via a communication unit 140. Optionally, controller 120 may perform any suitable processing on the sensed data, and communication unit 140 may transmit the processed data. Communication unit 140 may comprise any suitable communication device, including a wired or wireless module (e.g., a WiFi module), a Bluetooth™ communication module, near field communications (NFC), mobile broadband networks, and/or the like. In some examples, communication unit 140 is configured to communicate via a cellular network (e.g., a mobile network) and/or via a WiFi network, and can be switched selectively between cellular and WiFi functionality (e.g., based on a command from controller 120). In this case, the device can optionally be configured to communicate via a WiFi network when one or more WiFi networks are available, and to communicate via a cellular network when no WiFi network is available, or in any other situation in which using a cellular network is preferable or desirable.

Communication unit 140 transmits the data to a server system 144. At server system 144, the data may optionally be processed in any suitable manner. Server system 144 transmits the (e.g., processed) data to an electronic device 148, such as a computer, mobile device, smartphone, and/or any other suitable data-processing system. In general, the data sensed by sensors 124 may be processed and/or stored at controller 120, at server system 144, and/or at electronic device 148.

In some examples, electronic device 148 executes a software application 152 (AKA an app) configured to process and/or display information related to data received from server system 144. For example, app 152 may be configured to alert a user via the user's mobile digital device in response to sensed data from sensors 124 indicating a possible anomaly in the building water system. As another example, app 152 may be configured to periodically, and/or on demand, display information related to water usage in the building.

In some examples, server system 144 is configured to provide or facilitate a website or other online interface where information related to data sensed by device 104 can be displayed. The website may be accessible by electronic device 148 (or any other suitable device) via a network (e.g., the Internet).

In some examples, server system 144 transmits information to multiple electronic devices (e.g., to a smartphone and to a controller of a smart-home system). In other examples, server system 144 is omitted, and communication unit 140 transmits data directly to one or more electronic devices, and/or stores the data for later retrieval.

Electronic device 148, a website, and/or app 152 may be further configured to receive user instructions operable to control device 104. For example, electronic device 148 may be configured to transmit, in response to suitable user input, a signal to controller 120 causing the controller to close or open shutoff valve 116.

Optionally, device 104 may further include a human-machine interface (HMI) 156 disposed on or adjacent the device itself. HMI 156 may be configured to display device-related information and/or to receive commands. For example, HMI 156 may comprise one or more displays, LEDs, keyboards, buttons, touchscreens, touchpads, switches, and/or the like. In some examples, the information displayable and the commands receivable at HMI 156 is limited compared to information displayable and commands receivable at electronic device 148.

Device 104 includes a power supply 160 configured to provide power to appropriate components of the device (e.g., controller 120, valve motor 118, one or more of sensors 124, communication unit 140, and/or HMI 156). Power supply 160 may comprise any source of power suitable for powering device 104. In some examples, power supply 160 comprises one or more batteries, which may be rechargeable (e.g., lithium-ion secondary batteries).

B. First Illustrative Water-Monitoring Device

With reference to FIGS. 2-15, this section describes an illustrative water-monitoring device 200, which is an example of a water-monitoring device installable inline with a building water system.

Figure 2:
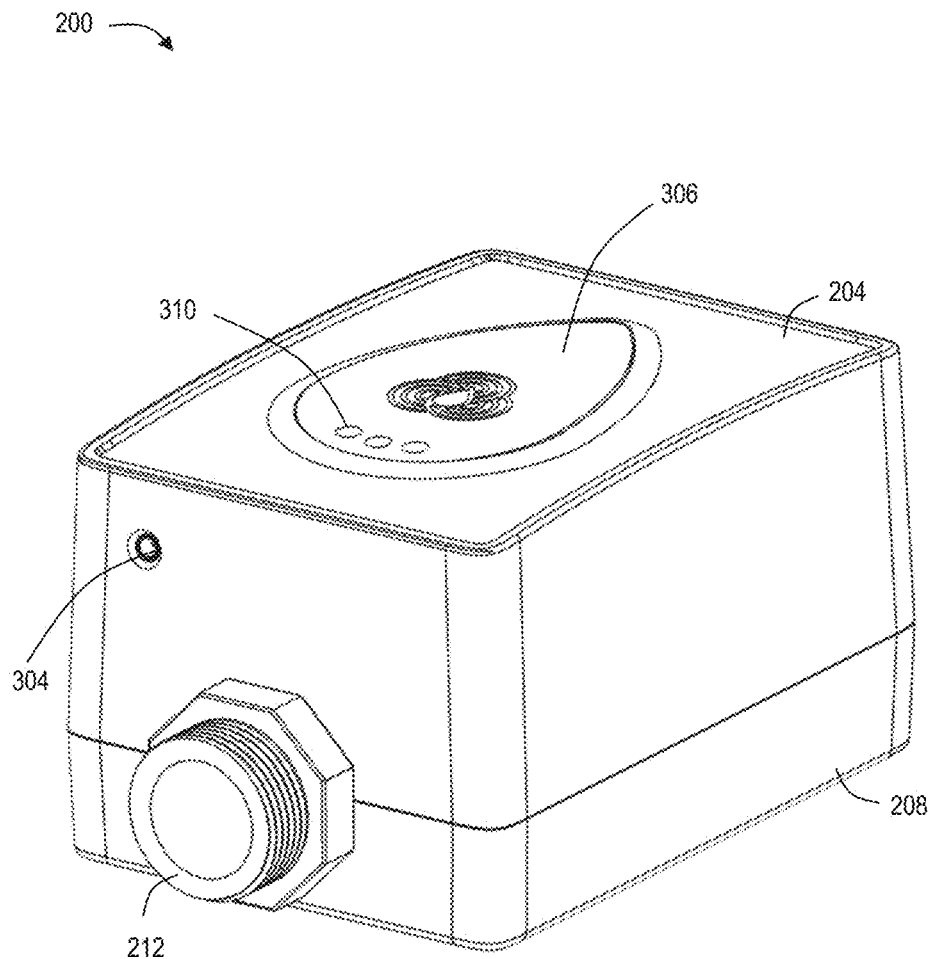
FIG. 2 is an isometric view of an illustrative water-monitoring device, in accordance with aspects of the present teachings.

As shown in FIG. 2, which is an isometric view of device 200, the device includes a housing having a first portion 204 (e.g., an upper portion) configured to mate with a second portion 208 (e.g., a lower portion). However, in other examples, the device housing may have any other suitable form and/or may be separable into different portions.

Figure 3:
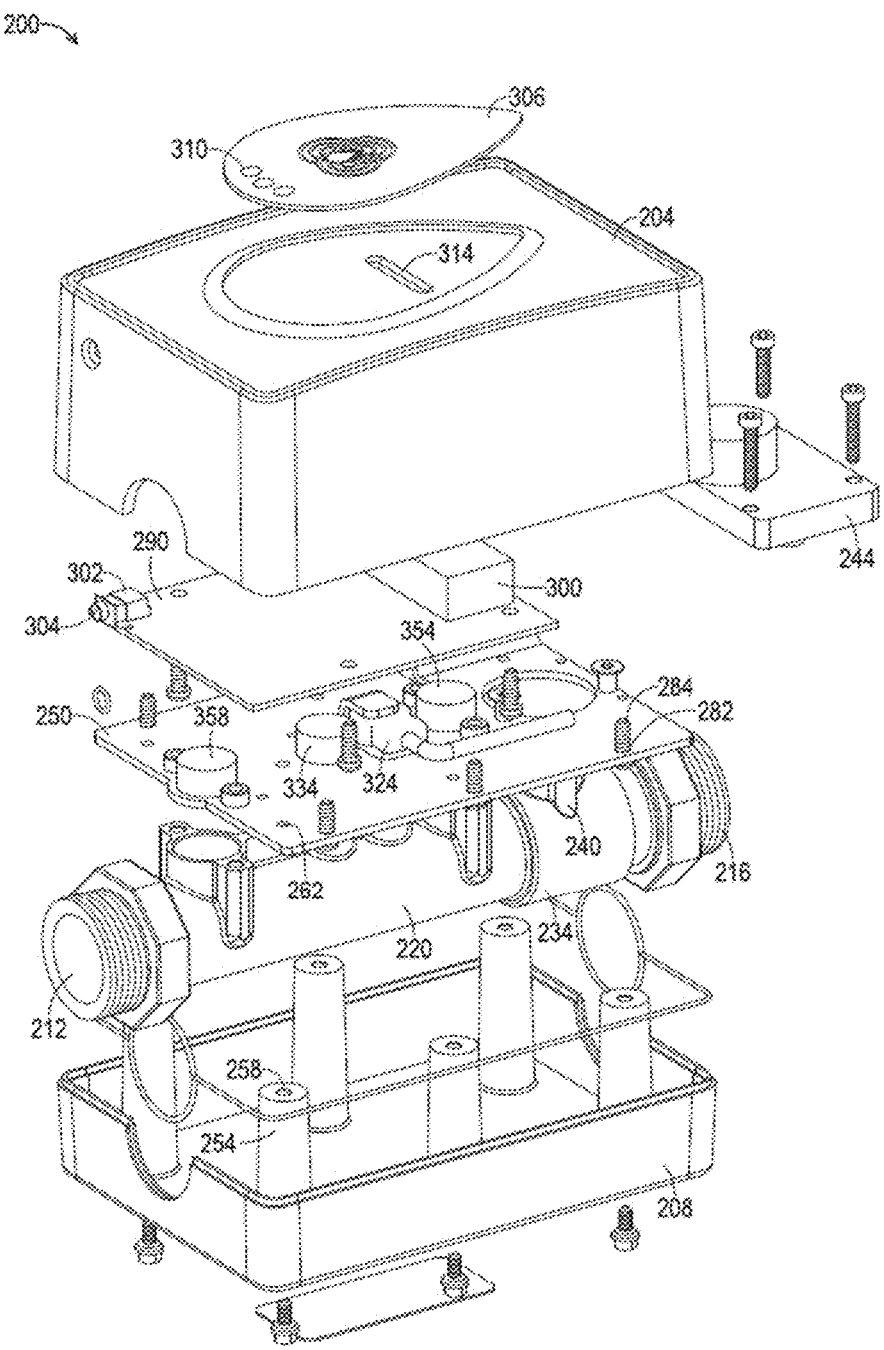
FIG. 3 is an exploded view of the device of FIG. 2.
Figure 4:
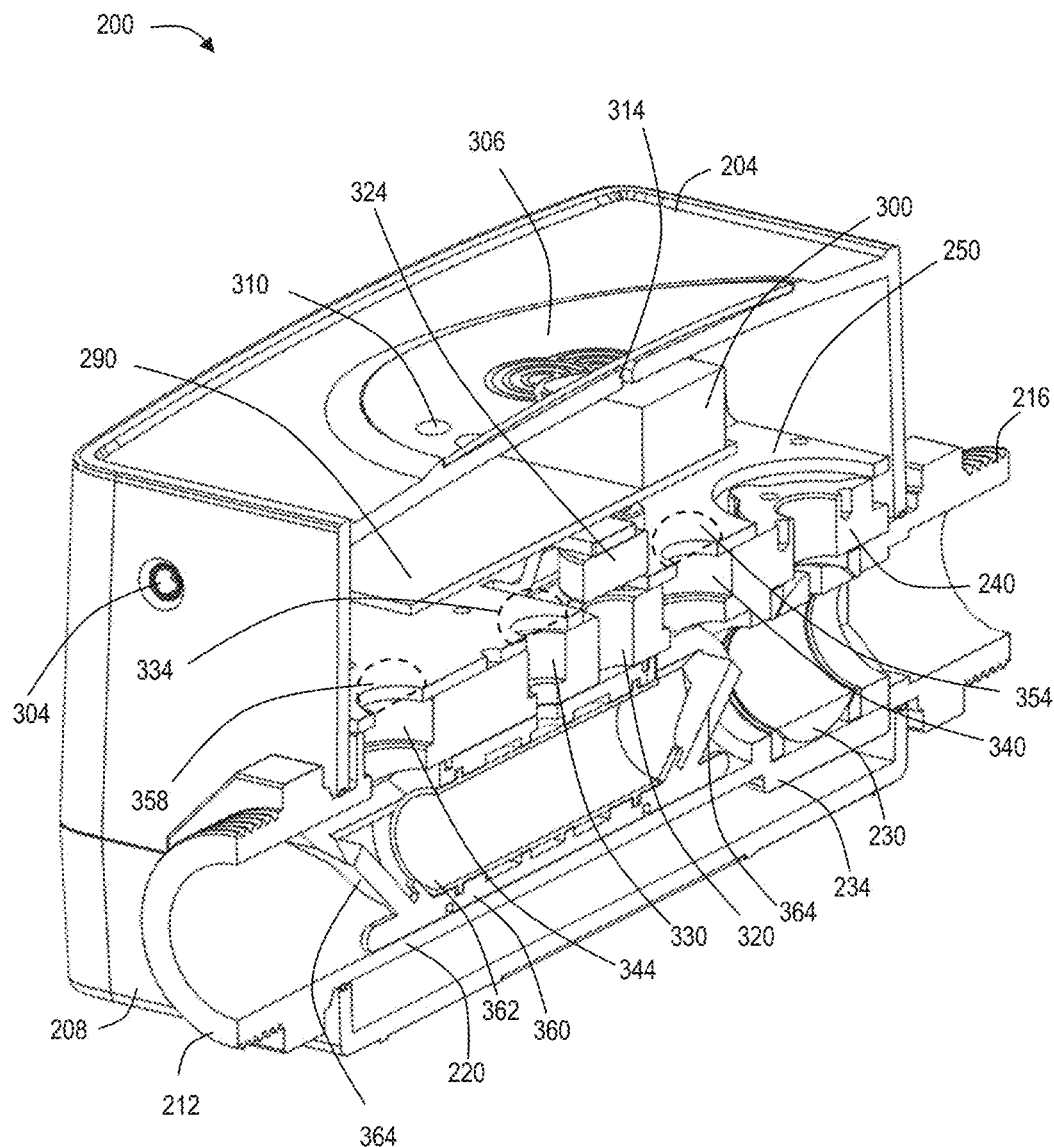
FIG. 4 is a sectional view of the device of FIG. 2.

As shown in FIGS. 3-4, device 200 has a first port 212 and a second port 216 at opposing ends of a spool 220. Ports 212 and 216 may be referred to as the inlet and outlet of the device, or vice versa. In other words, in at least some examples, the device may be installed in either orientation. However, in some examples, choosing which port is the inlet and which port is the outlet will have a substantive effect on other functionality of the device—See Section E.

Spool 220 comprises a pipe segment disposed within device 200, such that first port 212 extends from a first side of the device and second port 216 extends from a second side of the device. Water flows through device 200 within spool 220. However, in at least some examples, the water is not fully contained within the spool (e.g., the spool may have additional openings permitting water egress).

First and second ports 212, 216 are each configured to couple with a respective suitable pipe, tube, or other component of the building water system or supply line, allowing device 200 to be installed inline with the system. In the depicted example, spool 220 includes respective hex-shaped flanges adjacent ports 212, 216 to facilitate coupling to the building water system and/or water supply line.

A ball valve 230 is disposed within a valve housing 234 of spool 220. In this example, valve housing 234 is disposed adjacent second port 216, but in other examples, the valve housing may be disposed at any other suitable part of the spool. Valve housing 234 includes a bearing passage 240 projecting orthogonally from spool 220 and configured to receive a drive shaft of a valve motor 244. The shaft is omitted from FIGS. 3-4 for clarity. Valve motor 244 is configured to selectively transition (e.g., rotate) the ball portion of valve 230 between an open state and a closed state. When valve 230 is in the closed state, second port 216 is closed.

Valve motor 244 is disposed on a support plate 250 configured to support various components adjacent spool 220. The motor shaft extends through an opening in support plate 250 and through bearing 240 to valve 230.

Support plate 250 is attached to a plurality of columns 254 formed in second housing portion 208. Openings 258 in columns 254 are aligned with first openings 262 in support plate 250, and the columns are fastened to the support plate by a plurality of fasteners 264, e.g., screws (see FIG. 5) each extending through a respective pair of aligned openings. Similarly, support plate 250 is also attached to another plurality of columns 274 projecting from first housing portion 204 (see FIG. 5). Openings 278 in columns 274 are aligned with second openings 282 in support plate 250, and the columns are fastened to the support plate by a plurality of fasteners 284 (e.g., screws) each extending through a respective pair of aligned openings. In this manner, support plate 250 and the components supported thereon are retained in position inside device 200.

A printed circuit board (PCB) 290 is attached to yet another plurality of columns 294 projecting from first housing portion 204 (see FIG. 5) by a plurality of fasteners passing through aligned openings in the columns and openings in the PCB. PCB 290 includes a plurality of electronic components configured to facilitate functions of device 200. For example, a controller 300 is attached to PCB 290. Controller 300 is operatively coupled to valve motor 244 and configured to control the valve motor.

A battery or other power supply 302 of device 200 provides power to the valve motor, the controller, and any other appropriate components. Power supply 302 is coupled to a charging port 304. Charging port 304 and/or a separate data port may be configured to facilitate data transfer to or from a memory of device 200. In some examples, the power supply may alternatively or additionally include a connection (e.g., hardwired) to building electrical power.

A panel 306 comprising a membrane having one or more interaction elements 310 is disposed on an accessible outer surface of first housing 204. Interaction elements 310 may comprise any suitable devices for receiving commands to control device 200 and/or for displaying information related to the device. For example, interaction elements 310 may include one or more LEDs or illuminating elements configured to indicate device status (e.g., whether the device is powered, whether the valve is open or closed, whether the device is transmitting information, etc.). As another example, interaction elements 310 may include one or more buttons configured to control aspects of device 200 (e.g., to open or close the valve, to pause transmission of information, to cut power to one or more device components, etc.). A slot 314 in first housing 204 is configured to accommodate an electrical cable (not shown) coupling panel 306 to PCB 290.

Device 200 includes a plurality of sensors configured to sense information about water flowing through spool 220, such as temperature, salinity, pH, etc. A plurality of ports in the form of tubular apertures protrude from spool 220 in a transverse direction, allowing the sensors to acquire data relating to water within the spool. For example, in some cases the tubular aperture allows a portion of a sensor to contact the water. The sensors are configured to seal the ports against water egress, such that water flowing through spool 220 is prevented from exiting the spool via the ports. In some examples, one or more of the sensors is retained in place adjacent the associated port by a retaining device (e.g., a bracket comprising metal and/or another suitable material), and the retaining device and sensor together seal the port against water egress. Where necessary, support plate 250 has openings corresponding to the tubular apertures to allow sensors disposed on the support plate to access the spool interior.

A first tubular aperture or port 320 provides access to an interior of spool 220 for a pressure sensor 324. Pressure sensor 324 senses a water pressure within spool 220. With device 200 installed inline with the building system, pressures sensed by pressure sensor 324 correspond to pressure in the building system.

A second tubular aperture or port 330 of spool 220 provides access to the spool interior for a temperature sensor 334, which is configured to sense a water temperature within the spool. Temperature sensor 334 is in electronic communication with controller 300.

Figure 8:
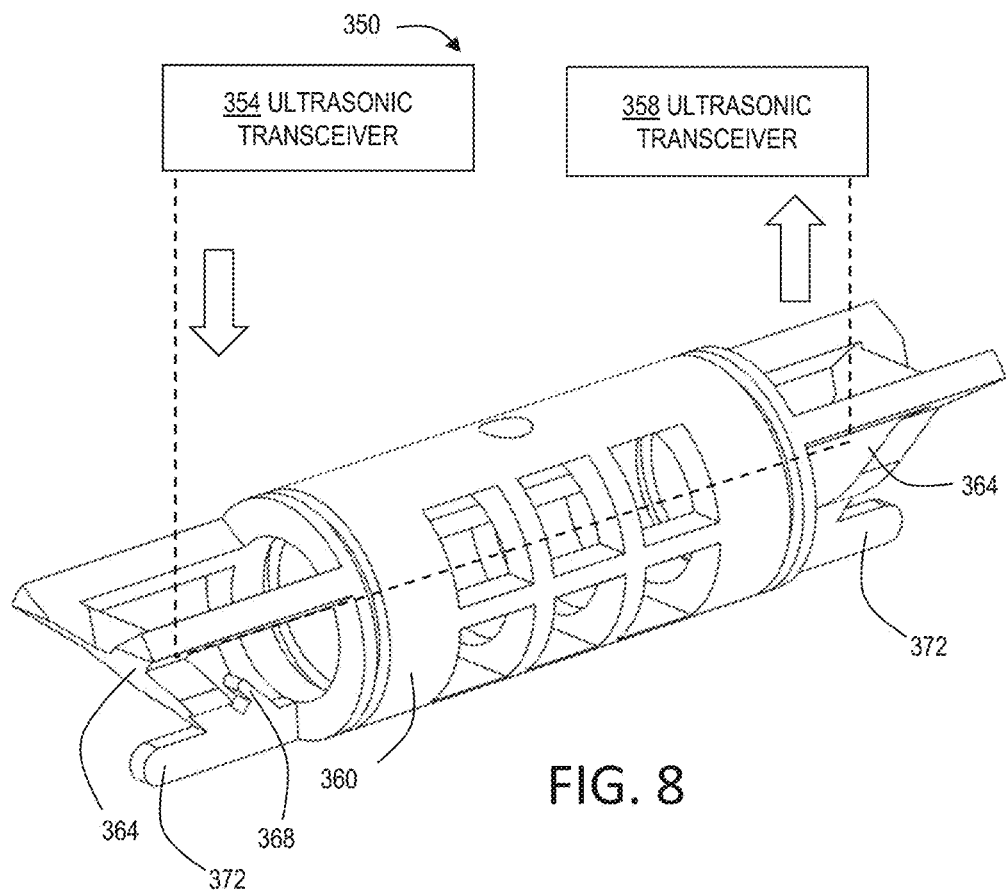
FIG. 8 is an isometric view of a flow sensor assembly of the device of FIG. 2.

A third tubular aperture or port 340 and a fourth tubular aperture or port 344 facilitate flow measurements by a flow sensor assembly 350 (see FIG. 8). Flow sensor assembly 350 includes a pair of ultrasonic transceivers 354, 358 disposed respectively at third tubular aperture 340 and at fourth tubular aperture 344. Each transceiver is configured to transmit ultrasonic signals and to receive ultrasonic signals.

Figure 5:
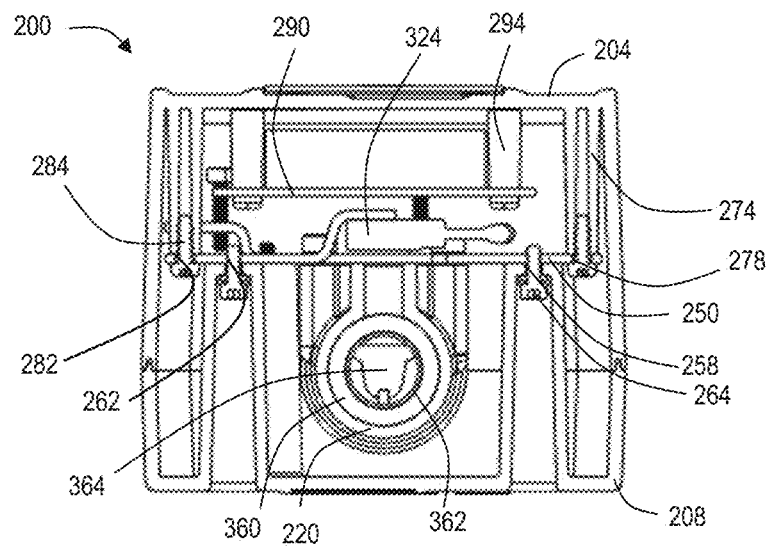
FIG. 5 is another sectional view of the device of FIG. 2.
Figure 6:
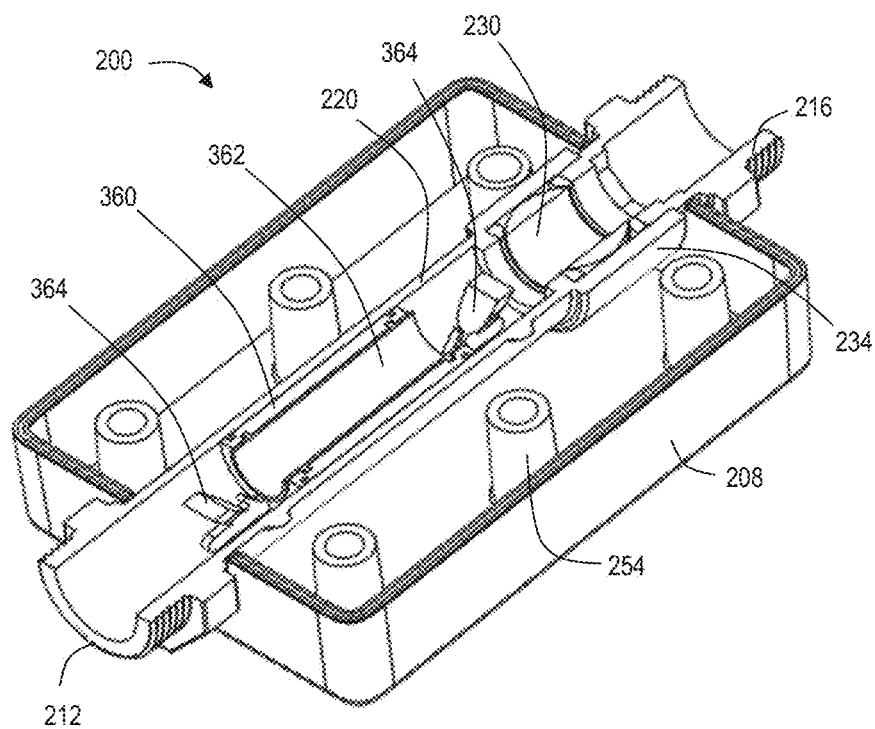
FIG. 6 is yet another sectional view of the device of FIG. 2.
Figure 7:
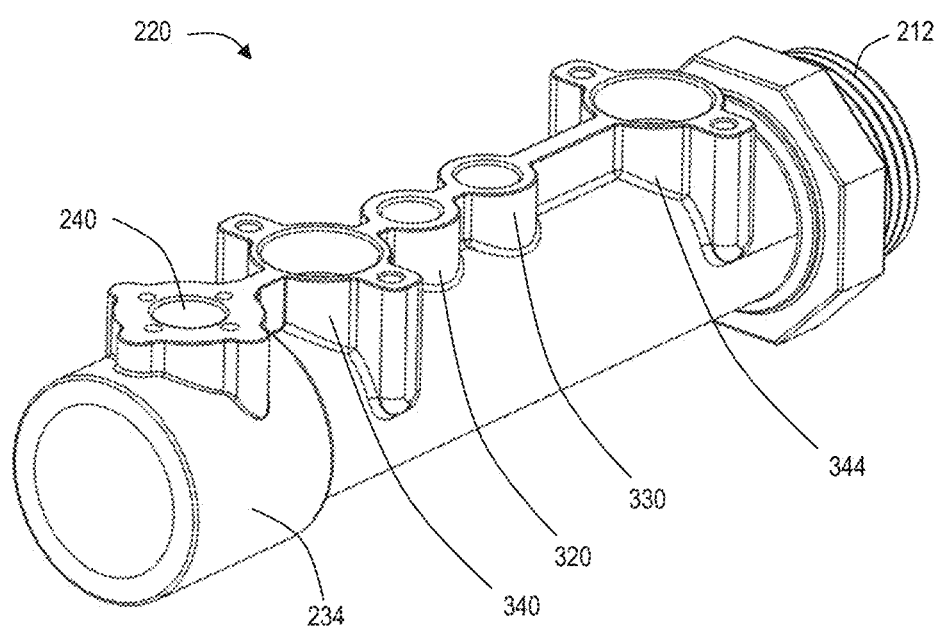
FIG. 7 is an isometric view of a spool of the device of FIG. 2.
Figure 9:
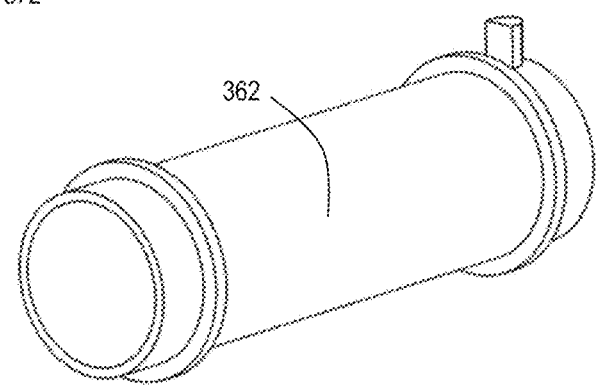
FIG. 9 is an isometric view of a flow tube of the device of FIG. 2.

As shown in FIGS. 4-9, flow sensor assembly 350 includes a spool insert 360 disposed within (e.g., coaxially with) spool 220, and a flow tube 362 disposed within (e.g., coaxially with) the spool insert. Specifically, FIGS. 4-6 are sectional views of device 200, showing spool insert 360 disposed within spool 220, and flow tube 362 disposed within the spool insert. FIG. 7 is an isometric view of a portion of spool 220. FIG. 8 is an isometric view of spool insert 360 with flow tube 362 omitted for clarity. FIG. 9 is an isometric view of flow tube 362.

Spool insert 360, which may also be referred to as a tube or exterior flow tube, comprises a substantially cylindrical body having a plurality of side openings and a pair of reflectors 364. The side openings allow water to flow. For example, water can flow through the side openings to ports of spool 220 (e.g., ports 320, 330, 340, 344, and/or any other appropriate ports) so that the sensors (e.g., pressure sensor 324, temperature sensor 334, and/or any other appropriate sensor) can sense properties of the water. Flow tube 362, which is disposed within spool insert 360 during normal use, enables a laminar flow of water between reflectors 364. This facilitates accurate flow measurements by flow sensor assembly 350.

Reflectors 364 are each disposed at a respective end of spool insert 360. Spool insert 360 is positioned within spool 220 such that one reflector 364 is disposed adjacent port 340, and the other reflector 364 is disposed adjacent port 344. Reflectors 364 are angled relative to a longitudinal axis of the spool insert, such that an ultrasonic signal transmitted from one of the ultrasonic transceivers 354, 358 is reflected by the corresponding reflector along the spool insert (i.e., in an axial direction) to the other reflector, which reflects the signal toward the other ultrasonic transceiver. Reflectors 364 are dimensioned to reflect at least a substantial portion of the ultrasonic signal while still permitting water to flow through spool 220. Due to flow tube 362, water flows between transceivers 354, 358 in a laminar flow.

Respective protrusions 368 disposed in front of each reflector 364 (i.e., adjacent the reflecting surface of the reflector) are configured to retain flow tube 362 within spool insert 360. Respective end projections 372 are disposed behind each reflector 364 (i.e., at ends of spool insert 360) to facilitate installation and/or removal of the spool insert from spool 220.

Transceivers 354, 358 are coupled to controller 300, e.g., by way of a dedicated processor or chip. The transceivers and the controller are configured to measure a transit time (e.g., a time of flight) of an ultrasonic signal traveling from transceiver 354 to transceiver 358, and a transit time of an ultrasonic signal traveling from transceiver 358 to transceiver 354. Accordingly, flow sensor assembly 350 measures a first transit time of an ultrasonic signal traveling through water in spool 220 in the direction of water flow, and a second transit time of an ultrasonic signal traveling through water in the spool against the direction of water flow. Based at least on the known distance between the reflectors, and on the first and second transit times (e.g., a difference between the first and second transit times), characteristics of water flow within the spool (e.g., a velocity and/or average velocity of the water, a speed of sound in the water, etc.) can be determined. These characteristics can be calculated based on measured data onboard the device (e.g., by controller 300) and/or off the device (e.g., by a server system or mobile device). As an example, if the water is not flowing at all, the first and second transit times will be equal (zero differential). If the water is flowing, then the time differential can be used to determine the velocity of the water.

Figure 10:
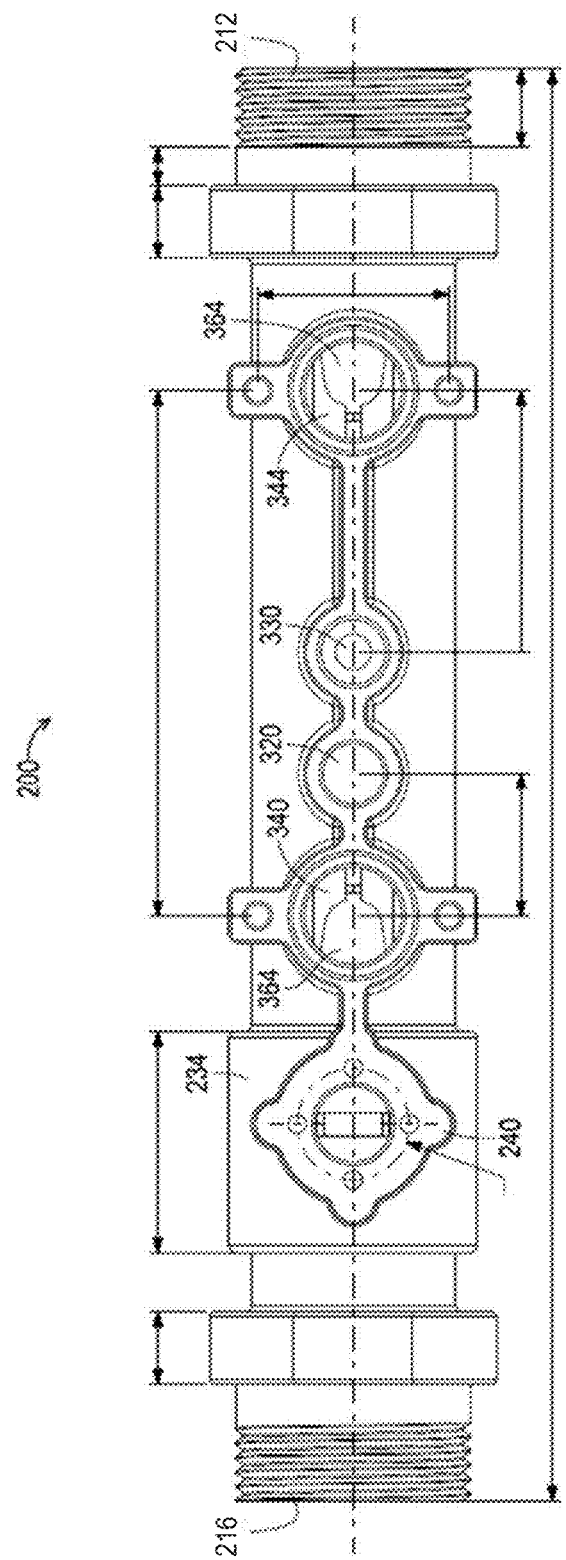
FIG. 10 is a top view of the spool of FIG. 7, depicting illustrative dimensions of the spool.

FIG. 10 is a top view of spool 220 with spool insert 360 disposed within the spool at its normal location. FIG. 10 depicts illustrative dimensions of the spool and spool insert, although other suitable dimensions may be utilized. The following quantitative values of the depicted dimensions are illustrative examples, presented without limitation.

A first distance D1 is defined between respective centers of third port 340 and fourth port 344. Accordingly, D1 corresponds to a distance between the two reflectors 364. A value of first distance D1 may be selected such to allow a high accuracy in measurements of the time of flight of ultrasonic signals between transceivers 354, 358. A distance that is too small can result in a time of flight so short that processing logic of the transceivers (or coupled to the transceivers) is not fast enough to measure the time of flight. A distance that is too large can result in an insufficiently laminar flow for accurate flow measurement. For example, a method of determining flow rate based on measured time(s) of flight may be based on an assumption that the water flow is laminar. If the actual water flow is not well approximated as laminar (e.g., because of excess turbulence), then the determination of flow rate or other properties may be inaccurate. In the depicted example, first distance D1 is 73.5 millimeters (mm). However, any suitable value may be selected based on dimensions of the device, properties of the water system, properties of device processing logic, and/or any other suitable factors to enable accurate and/or high-resolution measurement.

A second distance D2 defined between first port 320 and third port 340 is, in the depicted example, equal to 20 mm. A third distance D3 defined between second port 330 and fourth port 344 is, in the depicted example, equal to 36.5 mm. A fourth distance D4 defined between ends of ports 212, 216 is, in the depicted example, equal to 200 mm. A fifth distance D5 defined by an axial length of valve housing 234 is, in the depicted example, equal to 30.9 mm. A sixth distance D6 defined by an axial length of respective hex flanges at ports 212, 216 is, in the depicted example, equal to 10 mm. A seventh distance D7 defined by an axial length of a threaded portion of second port 216 is, in the depicted example, equal to 10.8 mm. An eight distance D8 defined between the threaded portion of port 216 and the adjacent hex-shaped flange is, in the depicted example, equal to 5.5 mm. A ninth distance D9 defined laterally across a structure comprising fourth port 344 is, in the depicted example, 26.5 mm. A tenth distance D10 defined by an inner diameter of valve bearing passage 240 is 15.5 mm.

Figure 11:
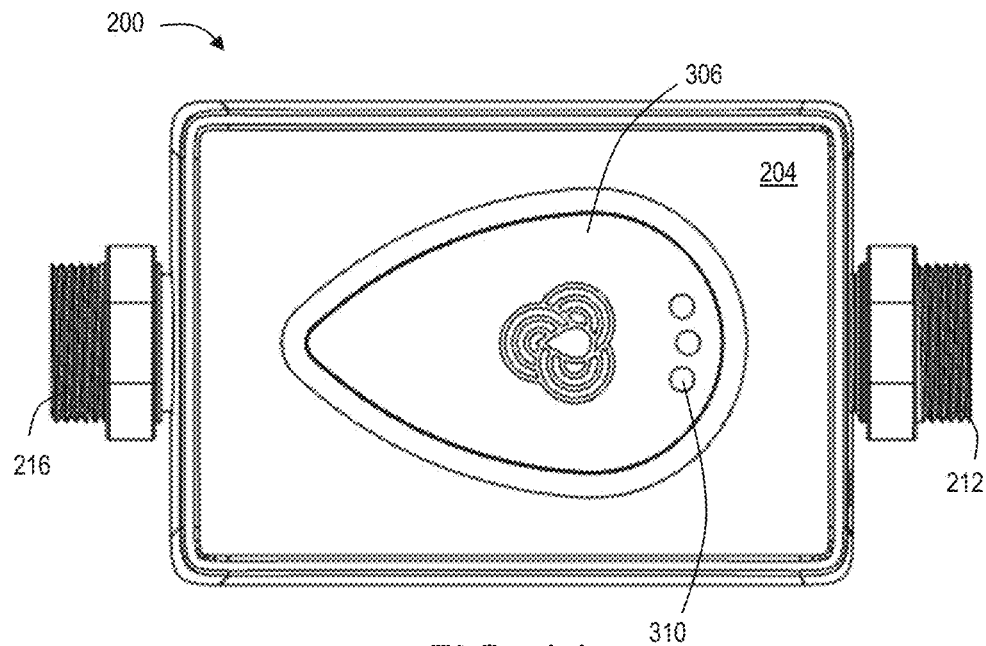
FIG. 11 is a top view of the device of FIG. 2.
Figure 12:
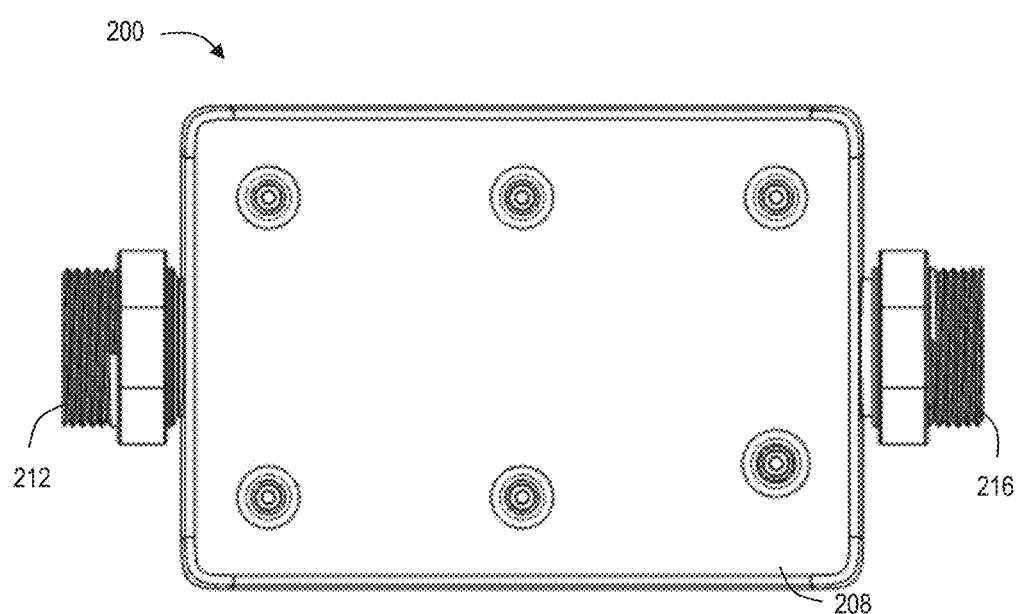
FIG. 12 is a bottom view of the device of FIG. 2.
Figure 13:
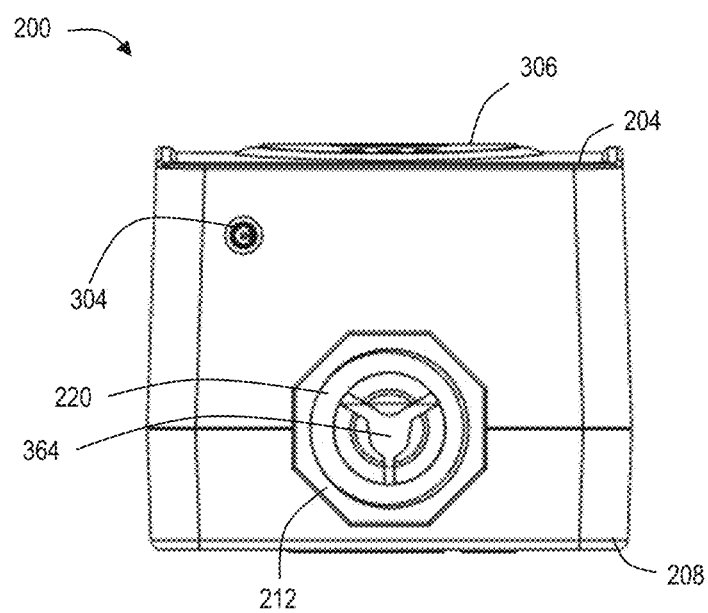
FIG. 13 is a front view of the device of FIG. 2.
Figure 14:
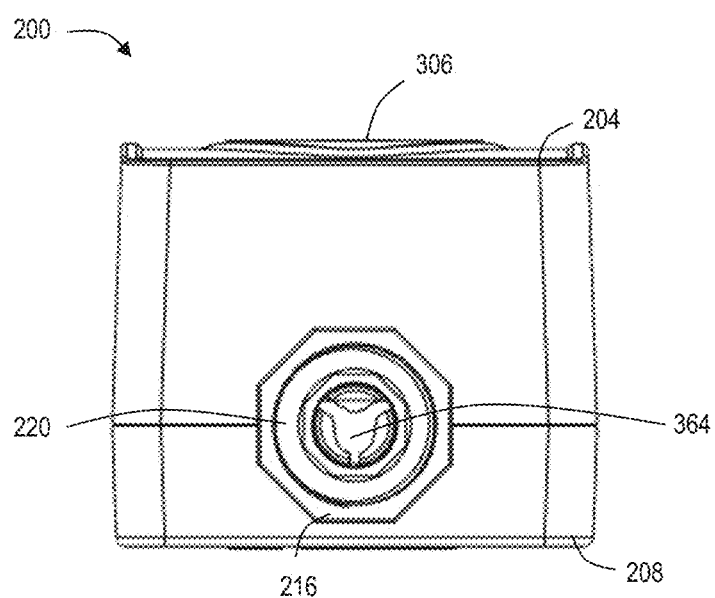
FIG. 14 is a back view of the device of FIG. 2.
Figure 15:
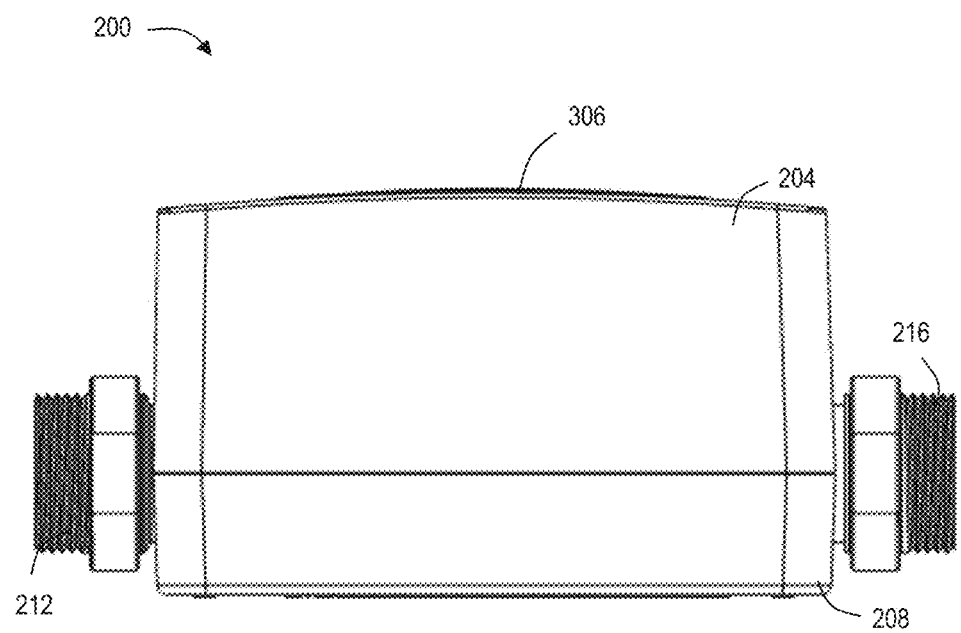
FIG. 15 is a side view of the device of FIG. 2.

FIGS. 11-15 depict various external views of device 200. Specifically, FIG. 11 is a top view, FIG. 12 is a bottom view, FIG. 13 is a front view, FIG. 14 is a back view, and FIG. 15 is a side view.

C. Second Illustrative Device

Figure 16:
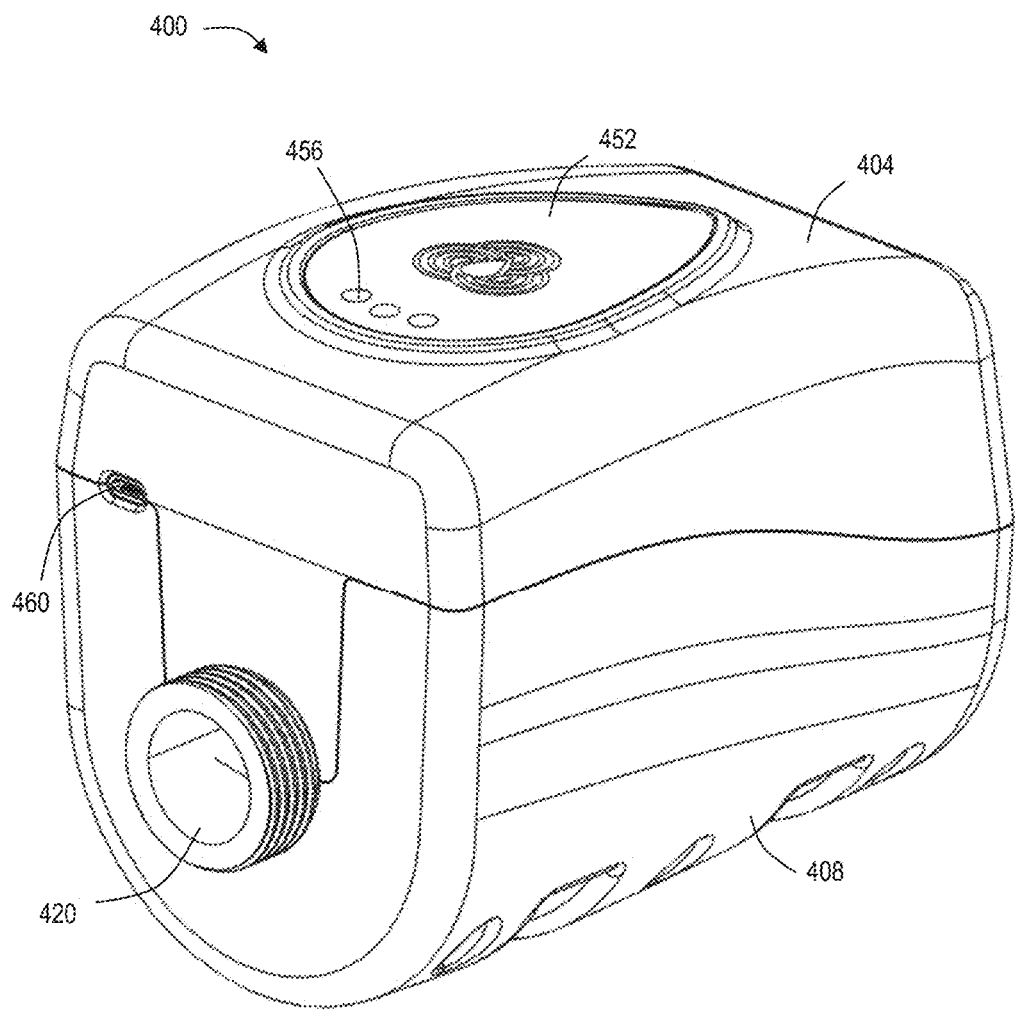
FIG. 16 is an isometric view of another illustrative water-monitoring device, in accordance with aspects of the present teachings.
Figure 17:
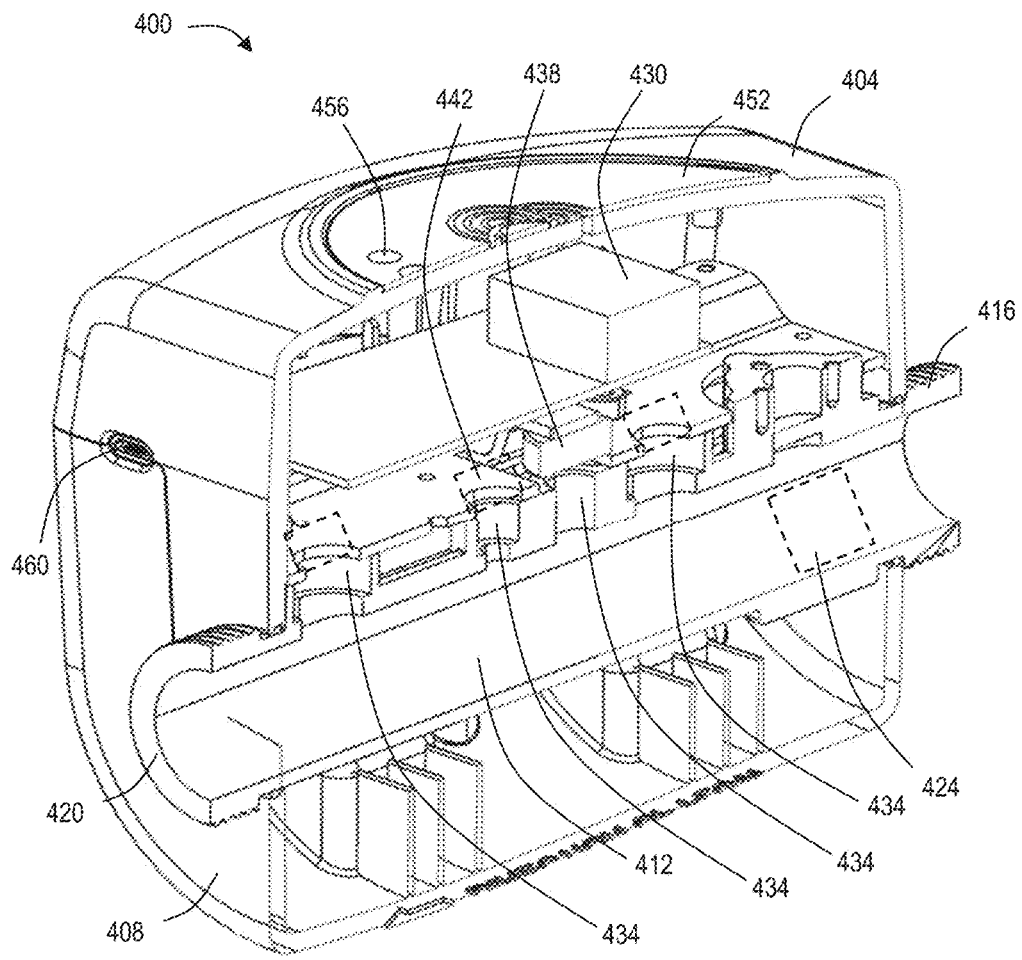
FIG. 17 is a sectional view of the device of FIG. 16.
Figure 18:
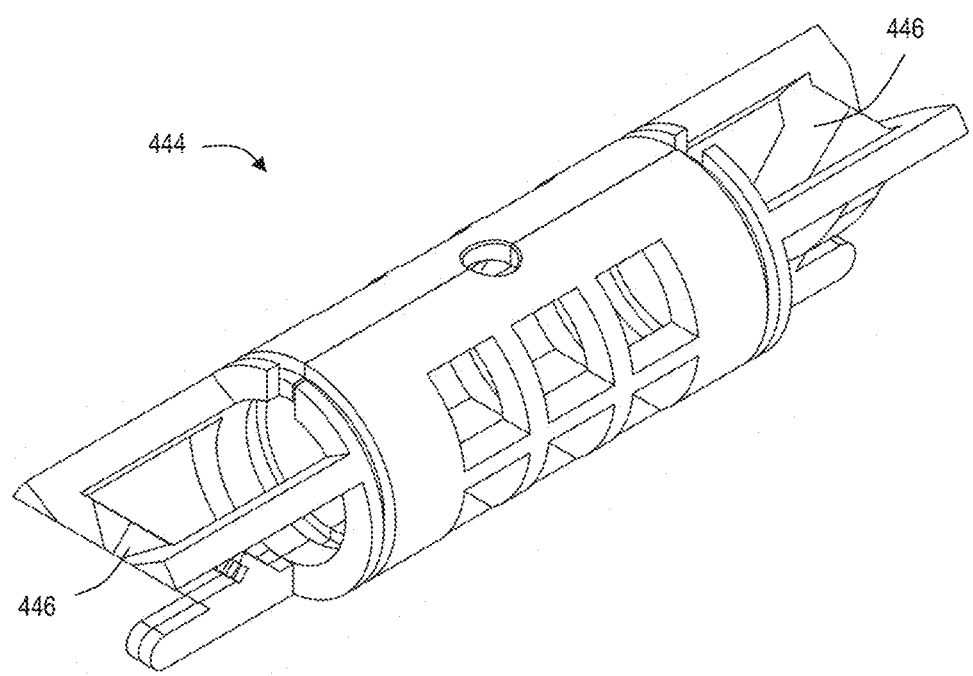
FIG. 18 is an isometric view of a spool insert of the device of FIG. 16.

With reference to FIGS. 16-18, this section describes an illustrative water-monitoring device 400, which is another example of water-monitoring device installable inline with a building water system. Device 400 may be substantially similar to device 200 in some respects.

FIG. 16 is an isometric view of device 400, and FIG. 17 is a sectional view of the device. As shown in FIGS. 16-17, device 400 includes a housing comprising a first housing portion 404 fitted together with a second housing portion 408. A spool 412 conveys water through the device between a first port 416 and a second port 420. In the depicted example, first port 416 is an inlet and second port 420 is an outlet, but in other examples, the first port may be outlet and the second port the inlet.

A valve 424 is disposed within spool 412 adjacent first port 416 and configured to selectively close the first port. Valve 424 is actuated by a valve motor (not shown) controlled by a controller 430.

Spool 412 has a plurality of side openings 434 allowing respective sensors to access water within the spool. The sensors include a pressure sensor 438 and a temperature sensor 442.

In normal use, a spool insert is disposed within spool 412. FIG. 18 is an isometric view of an illustrative spool insert 444, which may be similar in at least some respects to spool insert 360. For example, insert 444 has a plurality of side openings allowing water flow to the sensors, and a pair of ultrasonic reflectors 446 disposed at either end. Spool insert 444 is configured to accept a flow tube (e.g., flow tube 362 or another suitable tube) facilitating laminar flow between the reflectors. In some examples, spool inserts 360 and 412 are interchangeable. In some examples, device 400 includes spool insert 360 rather than spool insert 412, and in some examples, device 200 described above includes spool insert 412 rather than spool insert 360.

Returning to FIGS. 16-17, device 400 includes an exterior panel 452 having one or more interaction elements 456. An electronic port 460 allows data stored on the device to be manually offloaded, and may also facilitate charging a battery of the device.

D. Illustrative Water-Monitoring Methods

Figure 19:
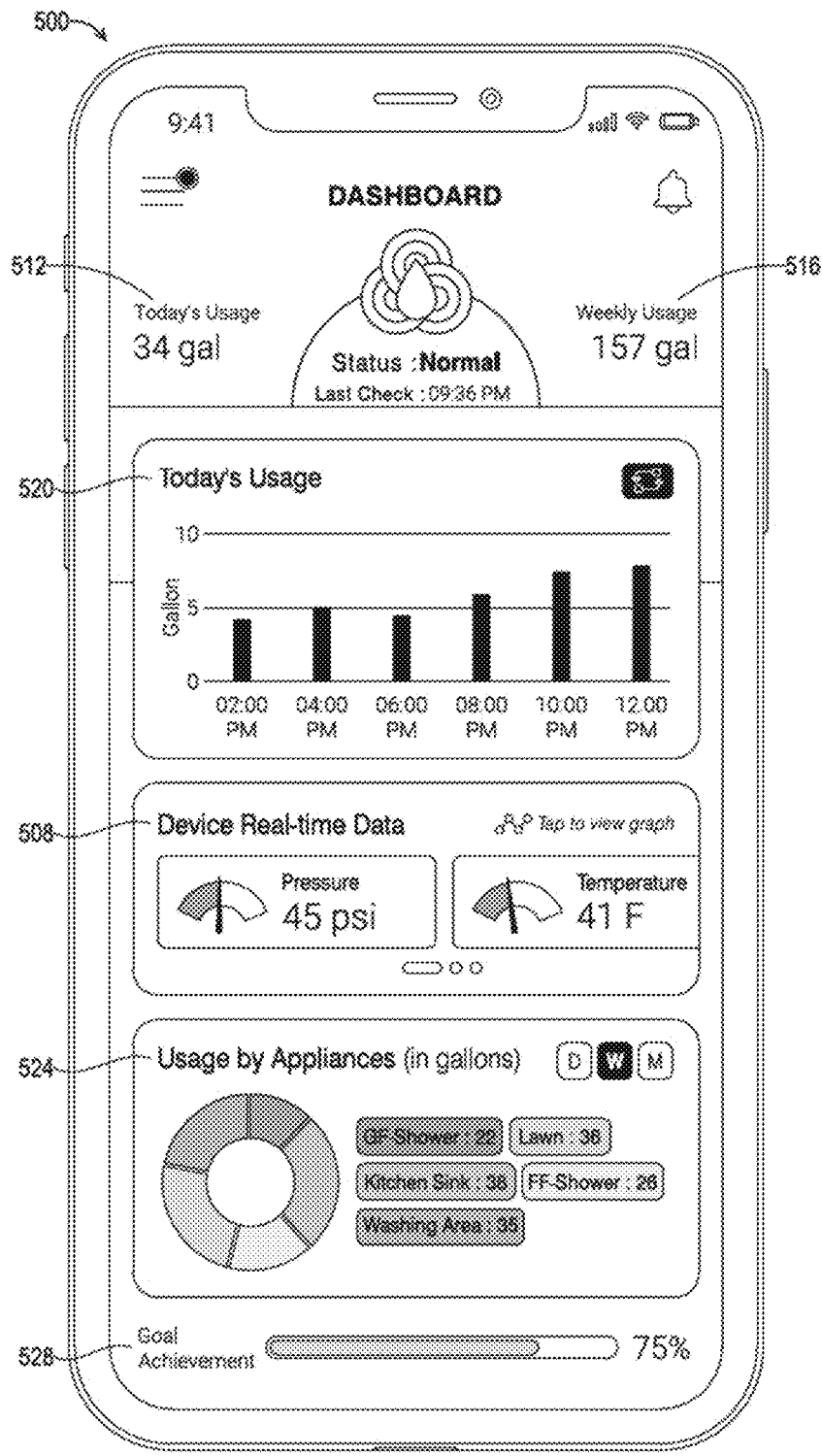
FIG. 19 is a screenshot of an illustrative app of the water-monitoring system of FIG. 1.
Figure 20:
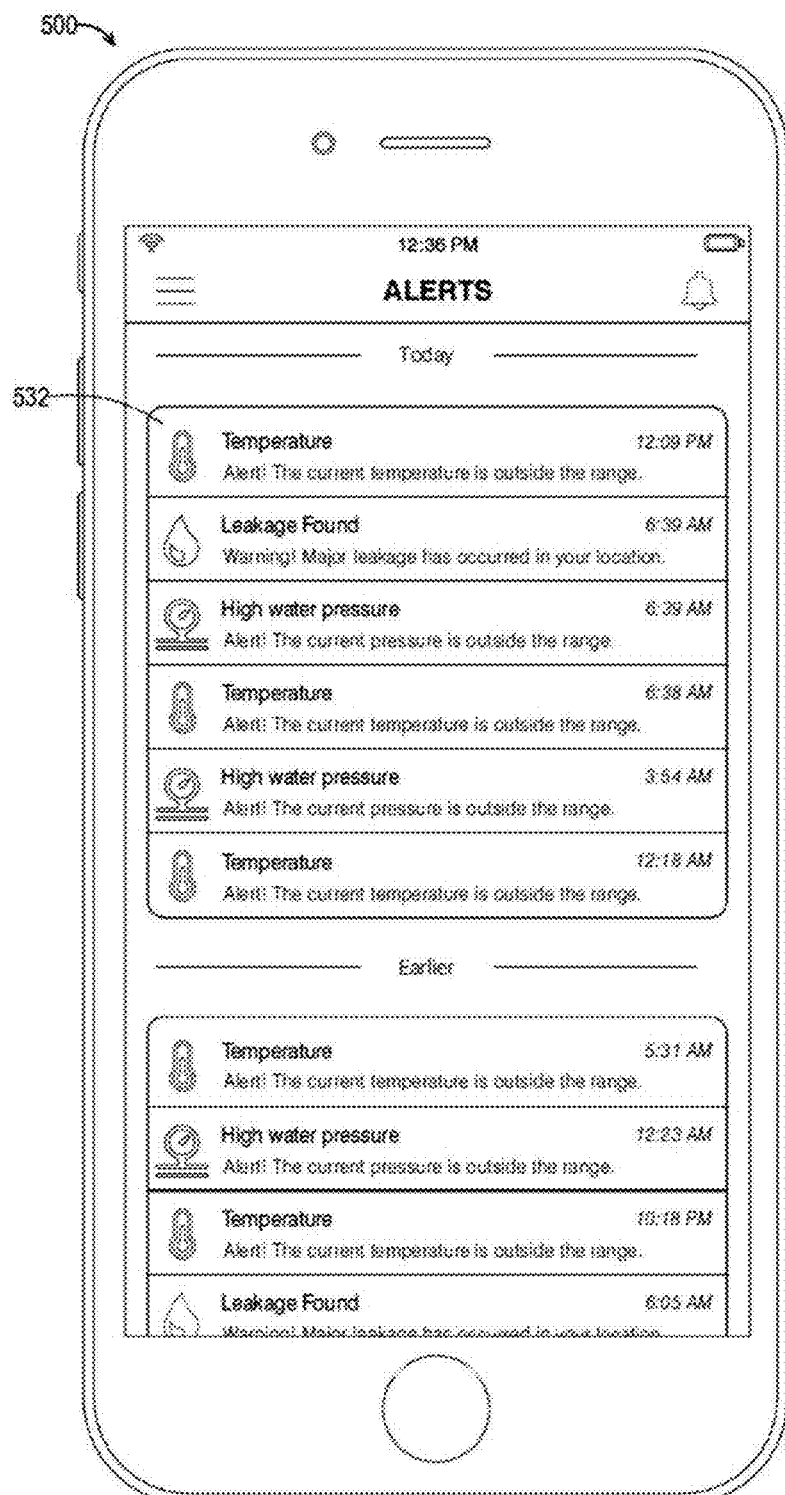
FIG. 20 is another screenshot of the app of FIG. 19.
Figure 21:
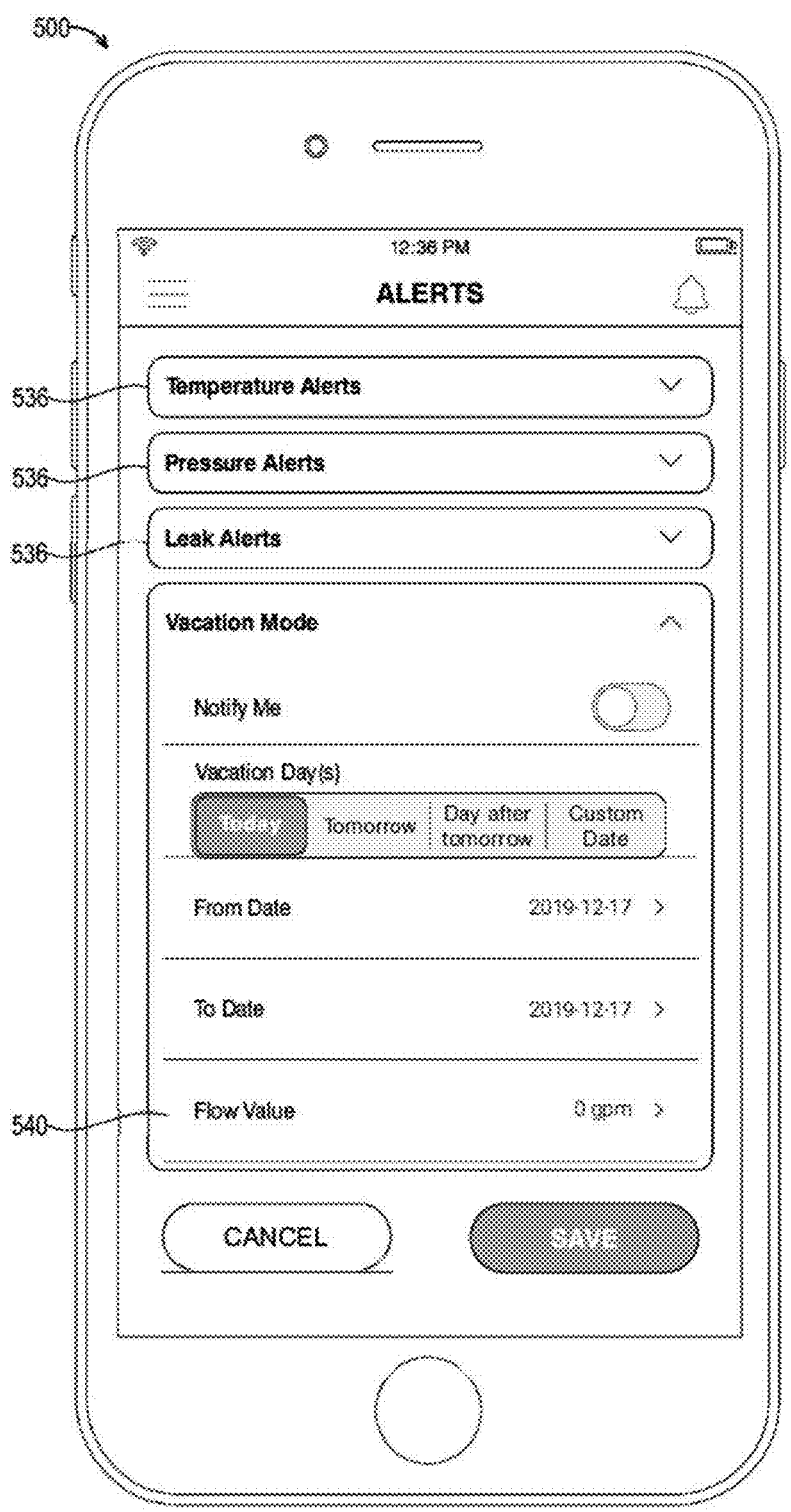
FIG. 21 is yet another screenshot of the app of FIG. 19.

With reference to FIGS. 19-21, this section describes illustrative aspects of water-monitoring methods carried out by a water-monitoring system (e.g., water-monitoring system 100) using data acquired by a water-monitoring device (e.g., device 104, 200, and/or 400).

As described above, information sensed by sensors of the water-monitoring device may be transmitted by a communication module of the device to a remote server system and/or to an electronic device (e.g., a smartphone, computer, etc.). In the examples described below, data acquired by the water-monitoring device may undergo processing onboard the device, at the server, and/or at the electronic device. For example, a cumulative amount of water used over a single day may be computed by the electronic device, by the server, and/or by onboard processing logic.

In FIGS. 19-21, illustrative water-monitoring functions are depicted in screenshots from an illustrative mobile app 500. Alternatively, or additionally, information displayed at the app of FIGS. 19-21 may be conveyed to the user in another suitable manner (e.g., at a HMI of the water-monitoring device, by a smart-home system in communication with the water-monitoring system, at a website accessible via the Internet, etc.).

FIG. 19 depicts a screenshot of a dashboard of the app, which in some examples is the default interface displayed when the app is opened. At the dashboard, the app indicates a status indicator 504 of the water-monitoring system. In the depicted example, the status is "normal", indicating that the building water system appears to be functioning as expected. In other situations, the status indicator may indicate a major problem (e.g., a large water leak), a minor problem (e.g., a low water temperature allowing the possibility of a pipe freeze, a small water leak, an inefficient appliance, etc.), an issue with the water-monitoring device (e.g., low battery), and/or any other suitable indicators.

A real-time display 508 displays the pressure presently measured by the device pressure sensor and the temperature presently measured at the device temperature sensor. In this example, the displayed temperature and pressure is communicated to the app (via the server) by the device in real-time, but in other examples the displayed temperature and pressure may be updated at selected intervals and/or on demand. Data from other sensors (e.g., flow sensors) may additionally or alternatively be displayed at real-time display 508.

A daily usage indicator 512 indicates the total amount of water used by the building system so far on the present day. This amount may be determined based on water velocities measured by the flow sensor assembly. Based on measured water velocities during a specified timeframe, and spatial dimensions of the portion of the device conveying the water, the volume of water that has flowed through the device during the specified timeframe can be determined. When the device is disposed at the inlet of the building water system, this volume of water corresponds to the amount of water that has entered the building water system during the specified timeframe. Accordingly, the volume of water corresponds to the amount of water used during the specified timeframe. Daily usage indicator 512 indicates the amount of water used on the present day. A comparative usage indicator 516 indicates the amount of water typically used (e.g., on average) during an entire week. This may help a user to see whether the amount of water used today/this week/etc. is unusual.

A usage chart 520 indicates the amount of water used during each of several predetermined time intervals. In this example, usage chart 520 indicates the amount of water used during two-hour periods of the present day, but other suitable intervals may be used.

A distribution chart 524 indicates the amount of water used by each of several household appliances (such as, e.g., a kitchen sink, a toilet, a lawn sprinkler system, a laundry system, and/or any other suitable fixture or subsystem connected to the building water supply) over a selectable time period (e.g., the present day, present week, present month, and/or any other suitable period). Optionally, a user may choose to view the usage over time (e.g., daily, hourly, weekly, etc.) of each appliance.

The usage corresponding to each appliance may be determined in any suitable manner. In some examples, the water-monitoring system identifies water usage corresponding to each of one or more specific appliances based on sensed data associated with operation of each appliance. For example, a data store of the system may include an association of a certain pattern of data (e.g., a profile of pressure vs. time) with the operation of a dishwasher. In response to sensing actual pressure data sufficiently similar to the stored pattern, the system determines that the dishwasher is in use during the time interval corresponding to the sensed pressure data resembling the stored pattern. The system estimates the amount of water used by operation of the dishwasher based on the amount of water that flowed through the monitoring device during the time interval.

Any suitable data (e.g., pressure, temperature, flow rate, etc.) may be used to identify operation of the various appliances. The associations between data patterns and appliance operation may be established and recognized in any suitable manner, including physical models, data fitting, machine learning or other artificial intelligence, and/or the like. Stored associations may be specific to a certain building or device, and/or may be available to any device or app accessing a server of the water-monitoring system. In some examples, associations are user-established for a specific building. For example, the app may prompt a user to flush a toilet, sense pressure and/or other data as the toilet is flushed, and store the sensed data in association with operation of the toilet. This association can be made accessible only to the app associated with the device in question, or also by other instances of the app (e.g., associated with other devices in other buildings). Additionally, or alternatively, some associations may be preprogrammed into the app, an associated server, or other suitable part of the system.

Sensed data may be compared to stored data patterns and recognized as corresponding to one or more stored data patterns in any suitable manner, including data fitting, machine learning/trained models, artificial intelligence, and/or any other suitable process.

A goal indicator 528 of the app indicates an amount of progress toward a predetermined goal. Goals selectable by the app user may include a maximum amount of water used during a predetermined time period (e.g., a day or a week), a predetermined distribution of water usage by room or appliance, and/or any other suitable goal.

FIG. 20 depicts another illustrative screenshot of app 500. The screenshot of FIG. 20 includes a plurality of alerts 532 displayable by app 500 in response to detection of certain events, based on information sensed by the water-monitoring device. For example, an alert can be displayed in response to one or more sensed or calculated quantities (e.g., water pressure, water usage, water velocity, water temperature, and/or the like) meeting predefined criteria (e.g., being above or below a predetermined threshold and/or outside of a predetermined range). These criteria may correspond to undesirable conditions such as a large or small water leak in the building system (based on, e.g., an amount of water usage or a rate of change of water usage), water temperatures indicating a danger of freezing, a problem with the water supply to the building system, an appliance malfunction, and so on.

FIG. 21 depicts yet another illustrative screenshot of app 500. The screenshot of FIG. 21 includes a user setting menu allowing a user to select one or more settings of the app. For example, alert settings 536 allow a user to select one or more settings related to alerts 532. Alert settings 536 may relate to the properties of a display of an alert, such as selection of sounds and/or visual cues associated with displaying an alert.

Additionally, or alternatively, alert settings 536 may relate to the predefined criteria for displaying one or more of the alerts. For example, a user may be allowed to choose a "freezing alert" temperature below which the app displays a low-temperature warning. In some cases, alert settings 536 allow one or more alerts to be disabled or paused.

Additionally, or alternatively, alert settings 536 may relate to action taken by the app and/or the water-monitoring device in response to detection of certain events. For example, the device may be configured to automatically close the device valve in response to detection of certain events, such as a very large or growing leak. In some examples, the automatic closure of the valve can be selectively enabled based on user settings, the conditions in response to which the valve will automatically close may be selected, and/or other suitable aspects of the automatic shut-off function may be selected.

The settings menu may allow a user to select one or more operating modes for the app and/or for the water-monitoring device. In the depicted example, the app can be put into a vacation mode for a selected period of time, during which the user will receive only serious alerts, with less serious alerts being temporarily suspended. In this example, the only alerts displayed by the app in vacation mode are those corresponding to flow values exceeding an amount selectable by the user at flow value selector 540. An excessive flow rate may indicate a possible leak, with the value of the flow rate typically indicating the likely severity of the leak. Accordingly, the flow value selected at flow value selector 540 is a proxy for severity of possible leaks detected by the water-monitoring system, and selector 540 effectively allows a user to determine the seriousness of the leaks for which they wish to receive an alert. In other examples, thresholds for other quantities (e.g., temperature or pressure) may alternatively or additionally be selectable at the vacation mode setting.

In some examples, more than one water-monitoring device is associated with a single instance of the app. For example, a plurality of water-monitoring devices may be installed in a single building system, with the app displaying (and optionally, combining) data from each of the devices.

In general, criteria for displaying an alert may be determined in any suitable manner. For example, the criteria may be preprogrammed into the app (or monitoring device) and/or may be selectable by a user, at least within a certain range. In some examples, artificial intelligence (AI) such as machine learning is used to determine alert criteria for a building water system and/or an appliance supplied by the system. The AI may be located at the app and/or at the server. The AI may determine alert criteria based on data associated with just one water-monitoring device, and/or based on data associated with a plurality of water-monitoring devices. For example, the AI may determine criteria based on aggregate data acquired by a plurality of water-monitoring devices that are located in a same geographic region (e.g., a neighborhood), or selected on any other suitable basis.

Criteria for displaying an alert may include sensed pressure, flow rate, and/or temperature corresponding to small leaks, large leaks, frozen pipes, impeded flow in the building system, malfunction or inefficiency of an appliance, malfunction or inadequate performance of a water pump of the building system, and/or any other suitable condition.

E. Illustrative Method of Determining a Height of a Leak

Figure 22:
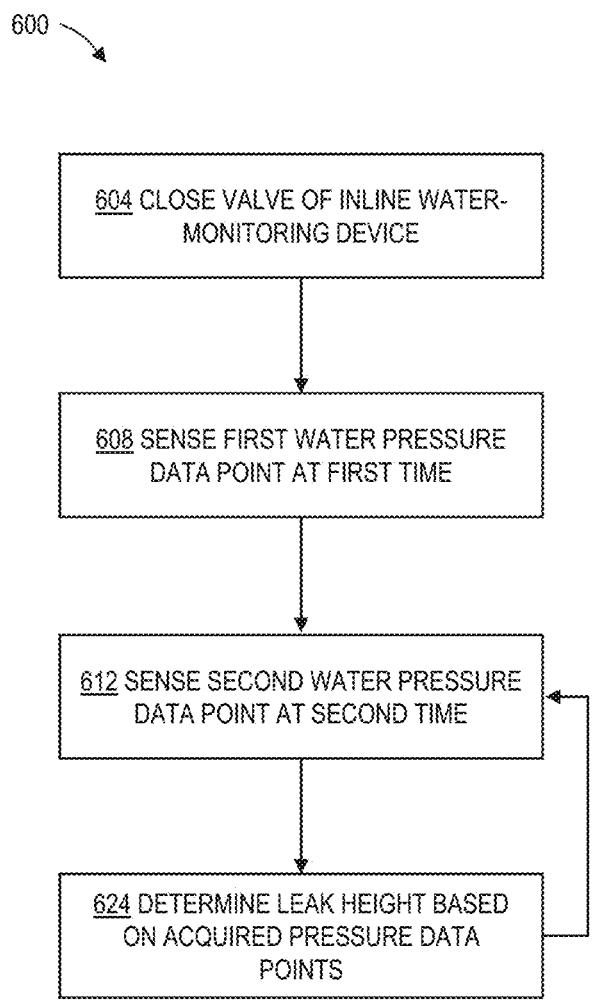
FIG. 22 is a flow chart depicting steps in an illustrative method of determining the height of a leak in a building water system, in accordance with aspects of the present teachings.

This section describes steps of an illustrative method 600 for determining a vertical height of a leak in a building water system; see FIG. 22. Aspects of water-monitoring systems and devices described above may be utilized in the method steps described below. Where appropriate, reference may be made to components and systems that may be used in carrying out each step. These references are for illustration, and are not intended to limit the possible ways of carrying out any particular step of the method.

Method 600 is performed using a water-monitoring system including a water-monitoring device installed inline at the inlet of a building water system. The water-monitoring device has a shutoff valve installed within the device upstream of the device sensors, such that the device sensors are able to measure aspects of the water in the building system when the shutoff valve is in a closed position. Device 104 of system 100 is an example of a suitable device. In some examples, method 600 is carried out entirely by the inline water-monitoring device. In other examples, however, an offboard data-processing system (e.g., a server and/or an electronic device running an associated app) performs aspects of the method. For example, the offboard data-processing system may carry out calculations described below.

FIG. 22 is a flowchart illustrating steps performed in an illustrative method, and may not recite the complete process or all steps of the method. Although various steps of method 600 are described below and depicted in FIG. 22, the steps need not necessarily all be performed, and in some cases may be performed simultaneously or in a different order than the order shown.

Step 604 of method 600 includes closing a valve of the device, such that the building water system is disconnected from the water supply. With the valve closed, no water enters the building system from the water supply. Because the device sensors are disposed downstream of the valve, the sensors can still acquire data relating to the water in the building system.

Step 608 of method 600 includes sensing, at a first time, a first water pressure data point associated with water in the building system. Step 612 includes sensing, at a second time, a second water pressure data point associated with the water in the building system. The water pressure may be measured using any suitable pressure sensor of the device. In this example, the first and second water pressure data points are sensed when the valve of the device is in a closed state, which may allow for increased accuracy of the method. Alternatively, or additionally, the method may include sensing some or all of the water pressure data points when the valve of the device is in an open state.

Step 612 may be repeated as needed to produce more pressure-time data points, as explained below. The time interval between successive measurements (e.g., between the first time and the second time) can be selected based on any suitable factors. In the example of method 600, the time interval is typically on the order of 1-2 minutes. However, any time interval suitable for obtaining data usable to predict leak height may be used. The time needed to acquire each water pressure data point can be very short (e.g., the device may be capable of producing hundreds of pressure readings per second, and the first and second water pressure data points may each be based on any suitable number of pressure readings and therefore can each be acquired in a very brief respective time interval).

Because water is a nearly incompressible fluid, the water pressure in the building system is at least partially determined by the height of water in the building (e.g., by a piezometric head). Accordingly, the measured water pressure indicates the height of the water in the building system. If there is a leak in the building system, the height of the water decreases as water exits the system through the leak point. Without intervention, the water height continues to decrease until the height of the water is equal to the height of the leak. Water pressure measurements made at successive points in time (e.g., at steps 608 and 610) therefore would show a decreasing pressure as water exits through the leak. The rate at which the pressure decreases slows as the water height approaches the leak height, with the pressure asymptotically approaching an approximately steady-state value corresponding to a water height equal to the leak height.

Figure 23:
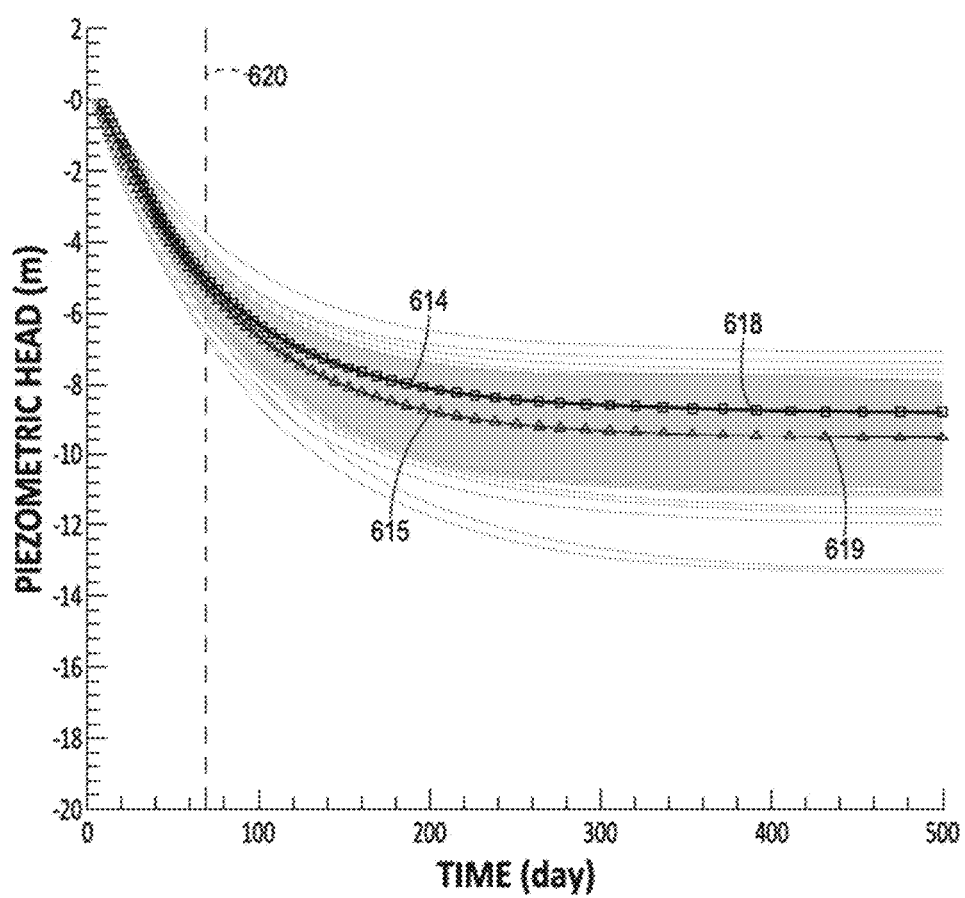
FIG. 23 is a chart depicting an illustrative asymptotic pressure drop-off curve corresponding to a building water system having a leak, in accordance with aspects of the present teachings.

FIG. 23 depicts illustrative curves of pressure (represented by piezometric head) over time in a leaking building water system. A first curve 614 represents pressure measurements in a building system having a leak at a first height, and a second curve 615 represents pressure measurements in a building system having a leak at a second height. As described above, curves 614, 615 are asymptotic curves having respective nearly constant portions 618, 619. At nearly constant portions 618, 619, the curves approach the asymptotic limit representing the water pressure experienced once almost all of the water has leaked out.

It would be possible to determine the height of the leak by repeatedly sensing pressure over time (e.g., at steps 608 and repeated step 612) until the pressure readings become nearly constant. At this point, the leak height could be calculated based on the nearly constant pressure, or compared to a plurality of theoretical curves computed for leaks of known heights. However, this can take a relatively long time, during which enough water may leak from the system to result in serious damage to the building. It is advantageous to identify the leak height based on pressure-time data points acquired well before the point in time at which the pressure-time curve becomes approximately constant.

Due, e.g., to the incompressible and Newtonian nature of water in the building system, it is relatively straightforward to predict the asymptotic limit of a pressure-time curve based on measurements made well before the time at which the pressure becomes nearly constant. For example, in FIG. 23, the piezometric head corresponding to nearly constant portion 618 of curve 614 can be predicted based on pressure measurements made prior to the time indicated at 620. Similarly, the piezometric head corresponding to nearly constant portion 619 of curve 615 can be predicted based on pressure measurements made prior to time 620. This allows the height of the leak to be predicted before all or most water has drained out the leak.

Accordingly, step 624 of method 600 includes determining the height of the leak based on pressure data acquired before all or most water has drained out the leak. This may be characterized as pressure data acquired while the pressure is dropping relatively rapidly (e.g., rapidly changing pressure data). In some examples, step 624 includes calculating an asymptotic limit of the pressure curve based on physical and/or data-based models, and determining the leak height based on the predicted asymptotic pressure. Alternatively, or additionally, step 624 may include determining the leak height by comparing the acquired pressure data to a plurality of stored pressure curves corresponding to known leak heights. Alternatively, or additionally, the leak height may be determined by performing data-fitting and/or machine learning on the acquired pressure data.

As an example, determining the leak height may include fitting the acquired pressure data to an equation of the form pressure=C+(1/time), where C is a constant. Fitting the acquired pressure data to this equation includes determining a value of C (e.g., iteratively, using a regression analysis and/or any other suitable technique). As can be understood from this equation, C is the asymptotic limit of the pressure curve. Accordingly, the determined value of C corresponds to the "final" pressure value achieved after all (or most) water has drained from the leak. The pressure value can be converted to a height using any suitable method. As an example, the height can be obtained from the pressure using the equation height=pressure/0.433, where 0.433 is the weight of a column of water having dimensions one inch by one inch by one foot at 4 degrees Celsius. A value other than 0.433 can be used if conditions warrant (e.g., if the water temperature is believed to differ sufficiently from 4 degrees Celsius).

In some examples, method 600 includes acquiring pressure data, attempting to determine the leak height based on the acquired pressure data, and then acquiring more pressure data if the leak height could not be satisfactorily determined based on the data already acquired. In other words, method 600 can include alternating between step 612 and step 624 until the determination of the leak height is successful, and/or until a confidence level or uncertainty in the determined leak height meets a predetermined threshold.

F. Illustrative Data Processing System

Figure 24:
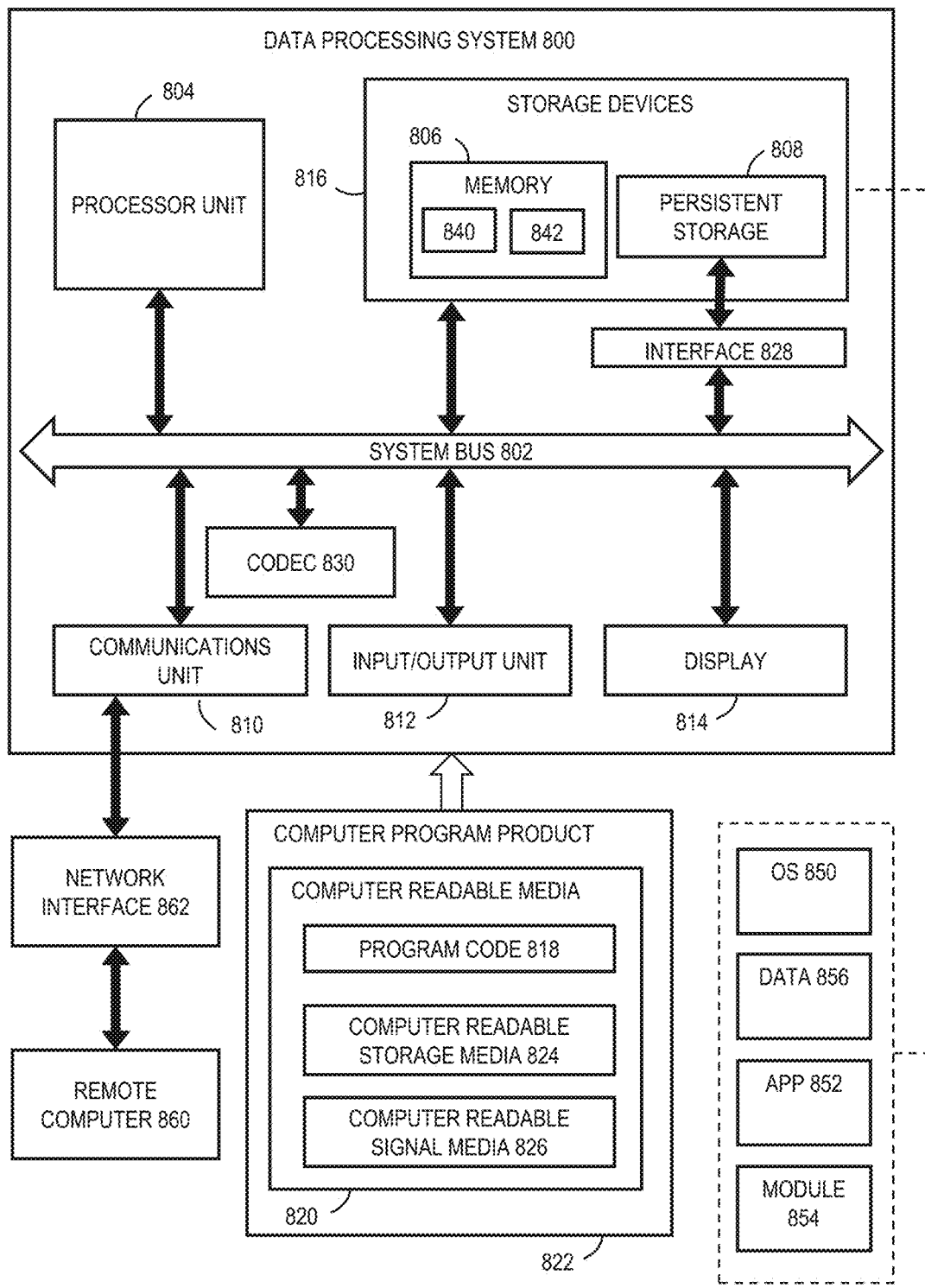
FIG. 24 is a schematic diagram depicting an illustrative data-processing system, in accordance with aspects of the present teachings.

As shown in FIG. 24, this example describes a data processing system 800 (also referred to as a computer, computing system, and/or computer system) in accordance with aspects of the present disclosure. In this example, data processing system 800 is an illustrative data processing system suitable for implementing aspects of the water-monitoring system. More specifically, in some examples, devices that are embodiments of data processing systems (e.g., smartphones, tablets, personal computers) may comprise a server of the water-monitoring system, an smartphone or computer running an app associated with the system, and/or an onboard computer of the inline water-monitoring device.

In this illustrative example, data processing system 800 includes a system bus 802 (also referred to as communications framework). System bus 802 may provide communications between a processor unit 804 (also referred to as a processor or processors), a memory 806, a persistent storage 808, a communications unit 810, an input/output (I/O) unit 812, a codec 830, and/or a display 814. Memory 806, persistent storage 808, communications unit 810, input/output (I/O) unit 812, display 814, and codec 830 are examples of resources that may be accessible by processor unit 804 via system bus 802.

Processor unit 804 serves to run instructions that may be loaded into memory 806. Processor unit 804 may comprise a number of processors, a multi-processor core, and/or a particular type of processor or processors (e.g., a central processing unit (CPU), graphics processing unit (GPU), etc.), depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device may include any suitable hardware capable of storing information (e.g., digital information), such as data, program code in functional form, and/or other suitable information, either on a temporary basis or a permanent basis.

Storage devices 816 also may be referred to as computer-readable storage devices or computer-readable media. Memory 806 may include a volatile storage memory 840 and a non-volatile memory 842. In some examples, a basic input/output system (BIOS), containing the basic routines to transfer information between elements within the data processing system 800, such as during start-up, may be stored in non-volatile memory 842. Persistent storage 808 may take various forms, depending on the particular implementation.

Persistent storage 808 may contain one or more components or devices. For example, persistent storage 808 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 808 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 808 to system bus 802, a removable or non-removable interface is typically used, such as interface 828.

Input/output (I/O) unit 812 allows for input and output of data with other devices that may be connected to data processing system 800 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 804 through system bus 802 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 800 and to output information from data processing system 800 to an output device. One or more output adapters may be provided for certain output devices (e.g., monitors, speakers, and printers, among others) which require special adapters. Suitable output adapters may include, e.g. video and sound cards that provide a means of connection between the output device and system bus 802. Other devices and/or systems of devices may provide both input and output capabilities, such as remote computer(s) 860. Display 814 may include any suitable human-machine interface or other mechanism configured to display information to a user, e.g., a CRT, LED, or LCD monitor or screen, etc.

Communications unit 810 refers to any suitable hardware and/or software employed to provide for communications with other data processing systems or devices. While communication unit 810 is shown inside data processing system 800, it may in some examples be at least partially external to data processing system 800. Communications unit 810 may include internal and external technologies, e.g., modems (including regular telephone grade modems, cable modems, and DSL modems), ISDN adapters, and/or wired and wireless Ethernet cards, hubs, routers, etc. Data processing system 800 may operate in a networked environment, using logical connections to one or more remote computers 860. A remote computer(s) 860 may include a personal computer (PC), a server, a router, a network PC, a workstation, a microprocessor-based appliance, a peer device, a smart phone, a tablet, another network note, and/or the like. Remote computer(s) 860 typically include many of the elements described relative to data processing system 800. Remote computer(s) 860 may be logically connected to data processing system 800 through a network interface 862 which is connected to data processing system 800 via communications unit 810. Network interface 862 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 830 may include an encoder, a decoder, or both, comprising hardware, software, or a combination of hardware and software. Codec 830 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 830 is depicted as a separate component, codec 830 may be contained or implemented in memory, e.g., non-volatile memory 842.

Non-volatile memory 842 may include read only memory (ROM), programmable ROM (PROM), electrically programmable ROM (EPROM), electrically erasable programmable ROM (EEPROM), flash memory, and/or the like, or any combination of these. Volatile memory 840 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 816, which are in communication with processor unit 804 through system bus 802. In these illustrative examples, the instructions are in a functional form in persistent storage 808. These instructions may be loaded into memory 806 for execution by processor unit 804. Processes of one or more embodiments of the present disclosure may be performed by processor unit 804 using computer-implemented instructions, which may be located in a memory, such as memory 806.

These instructions are referred to as program instructions, program code, computer usable program code, or computer-readable program code executed by a processor in processor unit 804. The program code in the different embodiments may be embodied on different physical or computer-readable storage media, such as memory 806 or persistent storage 808. Program code 818 may be located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may comprise computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a non-transitory, physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is media that can be touched by a person.

Alternatively, program code 818 may be transferred to data processing system 800, e.g., remotely over a network, using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The computer providing program code 818 may be a server computer, a client computer, or some other device capable of storing and transmitting program code 818.

In some examples, program code 818 may comprise an operating system (OS) 850. Operating system 850, which may be stored on persistent storage 808, controls and allocates resources of data processing system 800. One or more applications 852 take advantage of the operating system's management of resources via program modules 854, and program data 856 stored on storage devices 816. OS 850 may include any suitable software system configured to manage and expose hardware resources of computer 800 for sharing and use by applications 852. In some examples, OS 850 provides application programming interfaces (APIs) that facilitate connection of different type of hardware and/or provide applications 852 access to hardware and OS services. In some examples, certain applications 852 may provide further services for use by other applications 852, e.g., as is the case with so-called "middleware." Aspects of present disclosure may be implemented with respect to various operating systems or combinations of operating systems.

The different components illustrated for data processing system 800 are not meant to provide architectural limitations to the manner in which different embodiments may be implemented. One or more embodiments of the present disclosure may be implemented in a data processing system that includes fewer components or includes components in addition to and/or in place of those illustrated for computer 800. Other components shown in FIG. 24 can be varied from the examples depicted. Different embodiments may be implemented using any hardware device or system capable of running program code. As one example, data processing system 800 may include organic components integrated with inorganic components and/or may be comprised entirely of organic components (excluding a human being). For example, a storage device may be comprised of an organic semiconductor.

In some examples, processor unit 804 may take the form of a hardware unit having hardware circuits that are specifically manufactured or configured for a particular use, or to produce a particular outcome or progress. This type of hardware may perform operations without needing program code 818 to be loaded into a memory from a storage device to be configured to perform the operations. For example, processor unit 804 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 818) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, system bus 802 may comprise one or more buses, such as a system bus or an input/output bus. Of course, the bus system may be implemented using any suitable type of architecture that provides for a transfer of data between different components or devices attached to the bus system. System bus 802 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in system bus 802.

G. Illustrative Distributed Data Processing System

Figure 25:
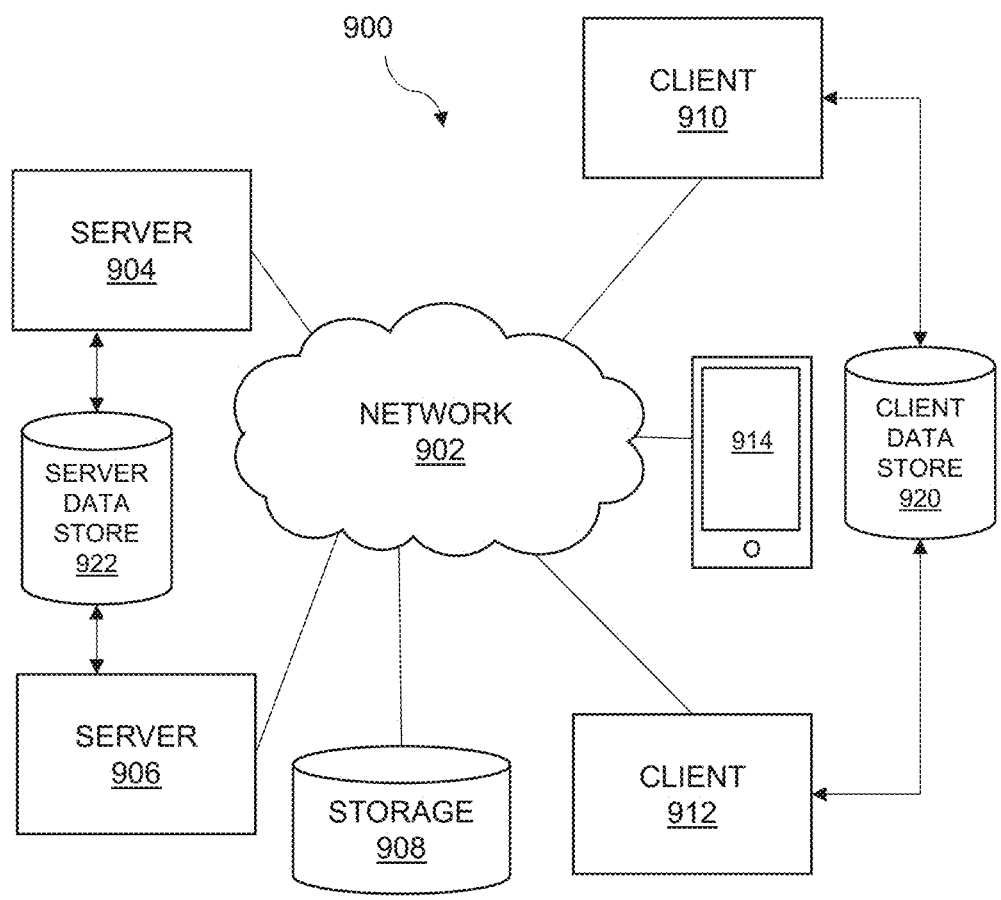
FIG. 25 is a schematic diagram depicting an illustrative distributed data-processing system, in accordance with aspects of the present teachings.

As shown in FIG. 25, this example describes a general network data processing system 900, interchangeably termed a computer network, a network system, a distributed data processing system, or a distributed network, aspects of which may be included in one or more illustrative embodiments of intelligent water-monitoring systems. For example, an inline water-monitoring device may be configured to communicate with a server and/or an end-user data-processing system (such as a smartphone) via a network (e.g., to transmit data acquired by the device). In examples including a server, the server may be configured to communicate with the end-user data-processing system via a network.

It should be appreciated that FIG. 25 is provided as an illustration of one implementation and is not intended to imply any limitation with regard to environments in which different embodiments may be implemented. Many modifications to the depicted environment may be made.

Network system 900 is a network of devices (e.g., computers), each of which may be an example of data processing system 800, and other components. Network data processing system 900 may include network 902, which is a medium configured to provide communications links between various devices and computers connected within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as do one or more computer-readable memories or storage devices 908. Network devices 904 and 906 are each examples of data processing system 800, described above. In the depicted example, devices 904 and 906 are shown as server computers, which are in communication with one or more server data store(s) 922 that may be employed to store information local to server computers 904 and 906, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 910 and 912 and/or a client smart device 914, may connect to network 902. Each of these devices is an example of data processing system 800, described above regarding FIG. 24. Client electronic devices 910, 912, and 914 may include, for example, one or more personal computers, network computers, and/or mobile computing devices such as personal digital assistants (PDAs), smart phones, handheld gaming devices, wearable devices, and/or tablet computers, and the like. In the depicted example, server 904 provides information, such as boot files, operating system images, and applications to one or more of client electronic devices 910, 912, and 914. Client electronic devices 910, 912, and 914 may be referred to as "clients" in the context of their relationship to a server such as server computer 904. Client devices may be in communication with one or more client data store(s) 920, which may be employed to store information local to the clients (e.g., cookie(s) and/or associated contextual information). Network data processing system 900 may include more or fewer servers and/or clients (or no servers or clients), as well as other devices not shown.

In some examples, first client electric device 910 may transfer an encoded file to server 904. Server 904 can store the file, decode the file, and/or transmit the file to second client electric device 912. In some examples, first client electric device 910 may transfer an uncompressed file to server 904 and server 904 may compress the file. In some examples, server 904 may encode text, audio, and/or video information, and transmit the information via network 902 to one or more clients.

Client smart device 914 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 900 may be stored in or on a computer-readable storage medium, such as network-connected storage device 908 and/or a persistent storage 808 of one of the network computers, as described above, and may be downloaded to a data processing system or other device for use. For example, program code may be stored on a computer-readable storage medium on server computer 904 and downloaded to client 910 over network 902, for use on client 910. In some examples, client data store 920 and server data store 922 reside on one or more storage devices 908 and/or 808.

Network data processing system 900 may be implemented as one or more of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 902 may be referred to as a "cloud." In those examples, each server 904 may be referred to as a cloud computing node, and client electronic devices may be referred to as cloud consumers, or the like. FIG. 25 is intended as an example, and not as an architectural limitation for any illustrative embodiments.

H. Illustrative Combinations and Additional Examples

This section describes additional aspects and features of intelligent water-monitoring systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for determining a height of a leak in a building water system, the method comprising:

shutting off a water supply to the building water system;

receiving, from a sensing device installed inline with the building water system, a first water pressure reading sensed at a first time;

receiving, from the sensing device, a second water pressure reading sensed at a second time later than the first time;

predicting, based at least on the first and second water pressure readings, a final pressure value corresponding to a hypothetical state wherein all water in the building water system is disposed at or below the height of the leak; and determining, based on the predicted final pressure value, the height of the leak.

A1. The method of paragraph A0, wherein predicting the final pressure value includes:

fitting the first and second water pressure readings to a pressure drop-off curve; and identifying an asymptotic value of the pressure drop-off curve as the final pressure value.

A2. The method of paragraph A0 or A1, further comprising closing a shutoff valve of the sensing device prior to the first time.

A3. The method of paragraph A2, wherein the shutoff valve comprises a ball valve.

A4. The method of any one of paragraphs A0 through A3, wherein determining the height of the leak comprises determining a building floor where the leak is located.

B0. A method for determining a height of a leak in a plumbing system, the method comprising:

closing a valve of a monitoring device installed at an inlet of the plumbing system, such that the plumbing system is cut off from a water supply;

receiving, from a pressure sensor of the monitoring device, data corresponding to a decreasing pressure of water in the plumbing system;

predicting, based on the data corresponding to the decreasing pressure, a final constant pressure of water in the plumbing system; and determining a water height corresponding to the predicted final constant pressure, the determined water height corresponding to the height of the leak.

B1. The method of paragraph B0, wherein the final constant pressure comprises an asymptotic value of a pressure drop-off curve.

B2. The method of paragraph B0 or B1, wherein the valve comprises a ball valve.

B3. The method of any one of paragraphs B0 through B2, wherein the plumbing system comprises the plumbing system of a house, and wherein determining the water height comprises identifying a story of the house.

C0. A method of sensing water usage data in a building, the method comprising:

transferring water into a plumbing system of the building via a monitoring device installed inline between a water supply and the plumbing system;

closing a valve of the monitoring device to disconnect the plumbing system from the water supply; and obtaining a first data reading by measuring, at a first time, at least one property of water within the monitoring device using a sensor disposed within the monitoring device.

C1. The method of paragraph C0, wherein the property comprises a pressure of water within the monitoring device.

C2. The method of paragraph C1, further comprising obtaining a second data reading by measuring the pressure of water within the monitoring device at a second time.

D0. A water-monitoring device configured to be installed inline with a building water system, the device comprising:

a pipe spool having an inlet at a first end, an outlet at a second end, and a plurality of side openings;

a plurality of sensors including at least:
a first ultrasonic transceiver disposed adjacent a first one of the side openings;
a second ultrasonic transceiver disposed adjacent a second one of the side openings; and
a pressure sensor disposed adjacent a third one of the side openings;
a shutoff valve;
an electronic controller in communication with each of the plurality of sensors; and
a communications module in communication with the controller and configured to transmit data sensed by the plurality of sensors.

D1. The water-monitoring device of paragraph D0, further comprising a temperature sensor disposed adjacent a fourth one of the side openings.

D2. The water-monitoring device of any one of paragraphs D0 through D1, further comprising a spool insert having a first reflector at a first end and a second reflector at a second end, wherein the spool insert is disposed within the pipe spool such that the first reflector is disposed underneath the first side opening and the second reflector is disposed underneath the second side opening, such that the first and second reflectors direct ultrasonic signals between the first and second ultrasonic transceivers.

D3. The water-monitoring device of paragraph D2, further comprising a flow tube disposed within the spool insert.

D4. The water-monitoring device of paragraph D2, wherein the first and second reflectors each comprise a substantially planar surface.

D5. The water-monitoring device of any one of paragraphs D0 through D4, wherein the shutoff valve is disposed between the inlet and the pressure sensor.

D6. The water-monitoring device of any one of paragraphs D0 through D5, wherein the communications module is configured to communicate (e.g., to transmit and/or receive signal(s)) via a cellular network.

E0. A method for sensing water flow, the method comprising:
generating a first ultrasonic signal using a first ultrasonic transceiver;
directing the first ultrasonic signal through a water pipe segment toward a first reflector;
reflecting the first ultrasonic signal toward a second ultrasonic transceiver using the first reflector;
receiving the first ultrasonic signal at the second ultrasonic transceiver; and
determining, using processing logic in communication with the first and second ultrasonic transceivers, a first time of flight corresponding to transit of the first ultrasonic signal between the first and second ultrasonic transceivers.

E1. The method of paragraph E0, wherein directing the first ultrasonic signal toward the first reflector includes reflecting the first ultrasonic signal toward the first reflector using a second reflector.

E2. The method of paragraph E1, wherein the first and second reflectors are disposed within the water pipe segment.

E3. The method of paragraph E2, further comprising:
generating a second ultrasonic signal using the second ultrasonic transceiver;
reflecting the second ultrasonic signal toward the second reflector using the first reflector;
reflecting the second ultrasonic signal toward the first ultrasonic transceiver using the second reflector;
receiving the second ultrasonic signal at the first ultrasonic transceiver; and
determining, using the processing logic, a second time of flight corresponding to a transit of the second ultrasonic signal between the second and first ultrasonic transceivers.

E4. The method of paragraph E3, further comprising:
determining, based on the first time of flight and the second time of flight, a flow rate of water through the water pipe segment.

E5. The method of paragraph E3, wherein the water pipe segment, the first and second ultrasonic transceivers, and the processing logic are at least partially contained within a same housing.

E6. The method of paragraph E5, wherein the water pipe segment is installed inline with a building plumbing system, the method further comprising shutting off a water supply of the building plumbing system prior to generating the first ultrasonic signal.

E7. The method of paragraph E6, wherein shutting off the water supply of the building plumbing system includes closing a shutoff valve coupled to the water pipe segment and disposed within the housing.

E8. The method of any one of paragraphs E0 through E7, wherein at least one of the first ultrasonic transceiver and the second ultrasonic transceiver is configured to sense a signal frequency.

Advantages, Features, and Benefits

The different embodiments and examples of the intelligent water-monitoring systems described herein provide several advantages over known solutions for sensing information relating to building water systems. For example, illustrative embodiments and examples described herein allow a height of a leak to be detected after only a limited amount of water has been lost at the leak.

Additionally, and among other benefits, illustrative embodiments and examples described herein allow a valve in an inline water-monitoring device to automatically be closed in response to detection of an anomalous event, thereby cutting the building water system off from the water supply.

Additionally, and among other benefits, illustrative embodiments and examples described herein allow accurate, high resolution flow rate measurements using ultrasonic transceivers and a pair of reflectors separated by a distance specifically selected to enable high accuracy time-of-flight measurements.

Additionally, and among other benefits, illustrative embodiments and examples described herein have an electronic/mechanical design allowing more sensitive measurements than known devices.

Additionally, and among other benefits, illustrative embodiments and examples described herein are configured to communicate via cellular network(s), allowing the device to communicate even in situations where WiFi is unavailable or unreliable (e.g., in geographic areas with unsuitable WiFi coverage, such as some rural locations), and/or in any other suitable situation.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for monitoring a building water system, the method comprising:
   at a selected time when a building water system is not otherwise in use, automatically isolating the building water system from a water supply by closing a shutoff valve of a monitoring device installed at an inlet of the building water system, such that the monitoring device is in fluid communication only with the building water system;
   based on a decreasing water pressure sensed by a pressure sensor of the monitoring device, predicting a final constant water pressure assuming a leak in the building water system, using one or more processors;
   determining, using the one or more processors, a water height corresponding to the predicted final constant pressure, the water height corresponding to a height of the leak; and
   communicating the height of the leak to a remote electronic device;
   wherein predicting the final constant water pressure includes utilizing the one or more processors to:
      fit a series of pressure readings from the pressure sensor to a pressure drop-off curve; and
      identify an asymptotic value of the pressure drop-off curve as the final constant water pressure.

2. The method of claim 1, wherein at least one of the one or more processors is located onboard the monitoring device.

3. The method of claim 1, wherein the shutoff valve comprises a motorized ball valve.

4. The method of claim 1, wherein determining the height of the leak comprises determining a building floor where the leak is located.

5. The method of claim 1, wherein the remote electronic device comprises a mobile digital device.

6. The method of claim 5, further comprising presenting information regarding the height of the leak on a display of the mobile digital device.

7. A water-monitoring device configured to be installed inline between a building water system and a water supply thereof, the device comprising:
   a pipe spool having an inlet at a first end, an outlet at a second end, and a plurality of ports;
   a plurality of sensors including:
      a first ultrasonic transceiver disposed adjacent a first port of the plurality of ports;
      a second ultrasonic transceiver disposed adjacent a second port of the plurality of ports; and
      a pressure sensor disposed adjacent a third port of the plurality of ports;
   a spool insert having a first reflector at a first end and a second reflector at a second end, wherein the spool insert is disposed within the pipe spool such that the first reflector is configured to reflect an ultrasonic signal passing through the first port and the second reflector is reflect an ultrasonic signal passing through the second port, such that the first and second reflectors are configured to direct ultrasonic signals between the first and second ultrasonic transceivers;
   a shutoff valve disposed between the inlet and the third port, such that a pressure of the building water system is sensed by the pressure sensor when the shutoff valve is closed;
   an electronic controller in communication with each of the plurality of sensors; and
   a communications module in communication with the controller and configured to transmit data sensed by the plurality of sensors.

8. The water-monitoring device of claim 7, wherein the communications module is configured to communicate via a cellular network.

9. The water-monitoring device of claim 7, further comprising a flow tube disposed within the spool insert.

10. The water-monitoring device of claim 7, wherein the shutoff valve comprises a motorized ball valve.

* * * * *